United States Patent
Bataller et al.

(10) Patent No.: US 10,453,278 B2
(45) Date of Patent: Oct. 22, 2019

(54) VIRTUAL ACCESS CONTROL

(71) Applicant: Accenture Global Services Limited, Dublin (IE)

(72) Inventors: Cyrille Bataller, Mougins (FR); Alastair Partington, Hertfordshire (GB); Anders Aström, Antibes (FR); Alessio Cavallini, Nice (FR); David Mark Irish, Bury St Edmunds (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 712 days.

(21) Appl. No.: 14/011,173

(22) Filed: Aug. 27, 2013

(65) Prior Publication Data
US 2014/0063191 A1   Mar. 6, 2014

(30) Foreign Application Priority Data

Aug. 27, 2012 (EP) ...................................... 12290281
Sep. 11, 2012 (EP) ...................................... 12290299

(51) Int. Cl.
*G07C 9/00* (2006.01)
*H04N 13/275* (2018.01)
(Continued)

(52) U.S. Cl.
CPC ..... *G07C 9/00079* (2013.01); *G06K 9/00208* (2013.01); *G06K 9/00228* (2013.01);
(Continued)

(58) Field of Classification Search
CPC .. G07C 9/00079; G07C 9/00158; G07C 9/00; G07C 9/00007; H04N 13/026
See application file for complete search history.

(56) References Cited

U.S. PATENT DOCUMENTS 6,111,517 A * 8/2000 Atick ..................... G06F 21/32
340/5.83
6,154,133 A 11/2000 Ross et al.
(Continued)

FOREIGN PATENT DOCUMENTS

EP      2133819        12/2009
WO      2011/128408 A1 10/2011

OTHER PUBLICATIONS

Blanz et al., Face Recognition Based on Fitting a 3D Morphable Model, Sep. 2003, IEEE Transactions on Pattern Analysis and Machine Intelligence, vol. 25.*

(Continued)

*Primary Examiner* — Jorge L Ortiz Criado
*Assistant Examiner* — Boubacar Abdou Tchoussou
(74) *Attorney, Agent, or Firm* — Mannava & Kang, P.C.

(57) ABSTRACT

Virtual access control may include detecting entry of a person into a virtual controlled zone, and counting and/or identifying people including the person entering into the virtual controlled zone. Virtual access control may further include determining an authorization of the person to continue through the virtual controlled zone based on a facial identification of the person, and alerting the person to stop, exit from, or continue through the virtual controlled zone based on the determined authorization. An alarm may be generated if the person violates directions provided by the alert.

3 Claims, 26 Drawing Sheets

(51) Int. Cl.
  *G08B 13/22* (2006.01)
  *G06K 9/00* (2006.01)
  *G06K 9/48* (2006.01)

(52) U.S. Cl.
  CPC ..... *G06K 9/00288* (2013.01); *G06K 9/00771* (2013.01); *G07C 9/00158* (2013.01); *G08B 13/22* (2013.01); *H04N 13/275* (2018.05); *G06K 2009/487* (2013.01); *G07C 9/00* (2013.01); *G07C 9/00007* (2013.01)

(56) References Cited

U.S. PATENT DOCUMENTS

| | | | |
|---|---|---|---|
| 7,102,512 | B2 | 9/2006 | Pendergraft |
| 8,160,892 | B2 | 4/2012 | Casey et al. |
| 2002/0057204 | A1* | 5/2002 | Bligh ............... G08B 7/062 340/691.1 |
| 2003/0142853 | A1 | 7/2003 | Waehner et al. |
| 2004/0153671 | A1* | 8/2004 | Schuyler ......... G07C 9/00111 726/9 |
| 2004/0181552 | A1* | 9/2004 | Milne ............... G06K 9/00221 |
| 2004/0223631 | A1* | 11/2004 | Waupotitsch ...... G06K 9/00208 382/118 |
| 2006/0225352 | A1 | 10/2006 | Fischer et al. |
| 2007/0122011 | A1 | 5/2007 | Takizawa |
| 2008/0285802 | A1* | 11/2008 | Bramblet ............ G07C 9/00 382/103 |
| 2009/0167857 | A1* | 7/2009 | Matsuda .............. G07C 9/00 348/143 |
| 2010/0052947 | A1 | 3/2010 | Lin et al. |
| 2011/0255746 | A1 | 10/2011 | Berkovich et al. |

OTHER PUBLICATIONS

Medioni et al., Identifying Noncooperative Subjects at a Distance Using Face Images and Inferred Three-Dimensional Face Models, IEEE Transactions on Systems, Man, and Cybernetics-Part A: Systems and Humans, vol. 39, No. 1, Jan. 2009.*
Xu et al., A Rapid Method for Passing People Counting in Monocular Video Sequences, Proceedings of the Sixth International Conference on Machine Learning and Cybernetics, Hong Kong, Aug. 19-22, 2007.*
"Patent Examination Report No. 1" on Australia Patent Application No. 2013221920, IP Australia, dated May 9, 2014, 5 pages.

* cited by examiner

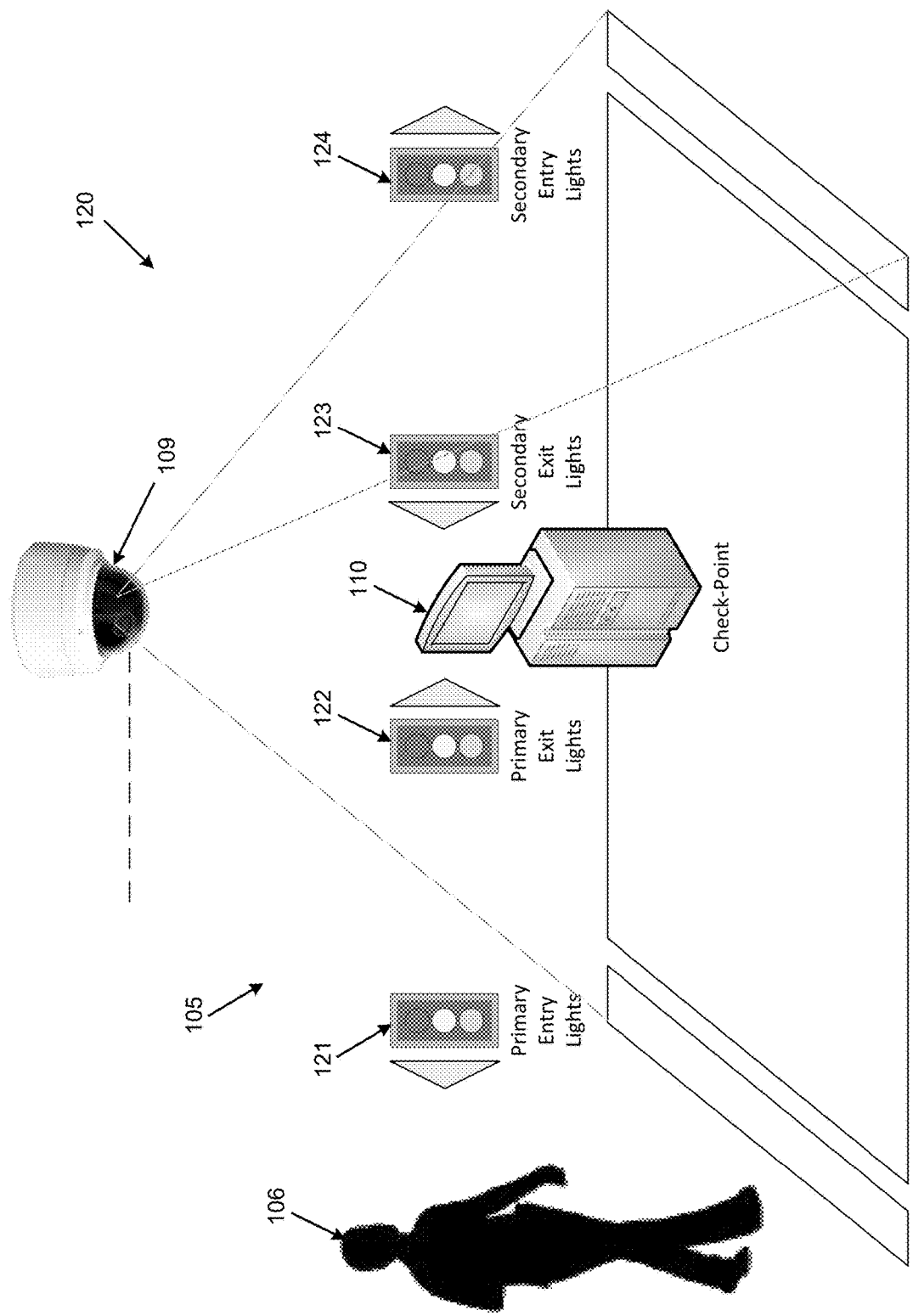

221

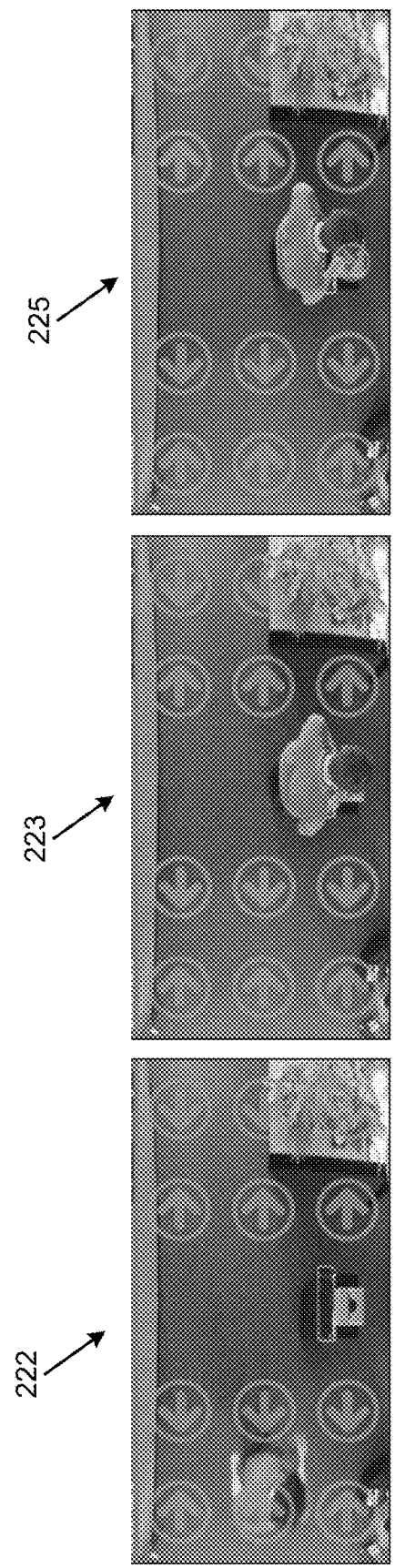

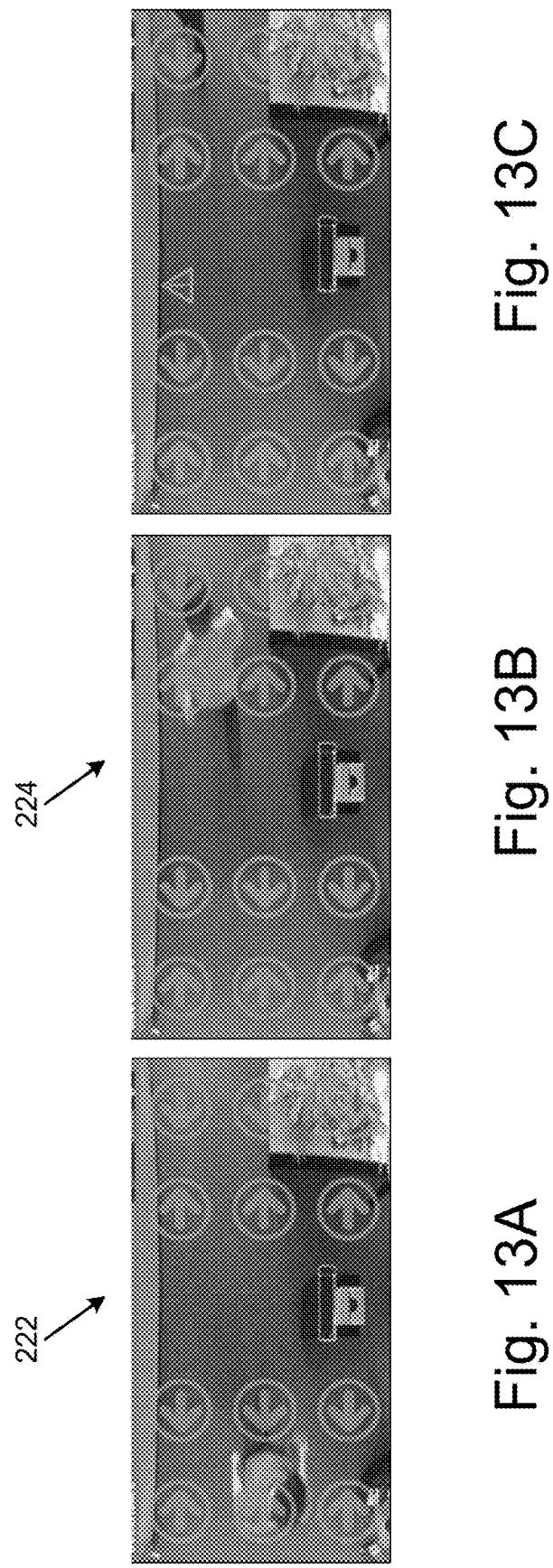

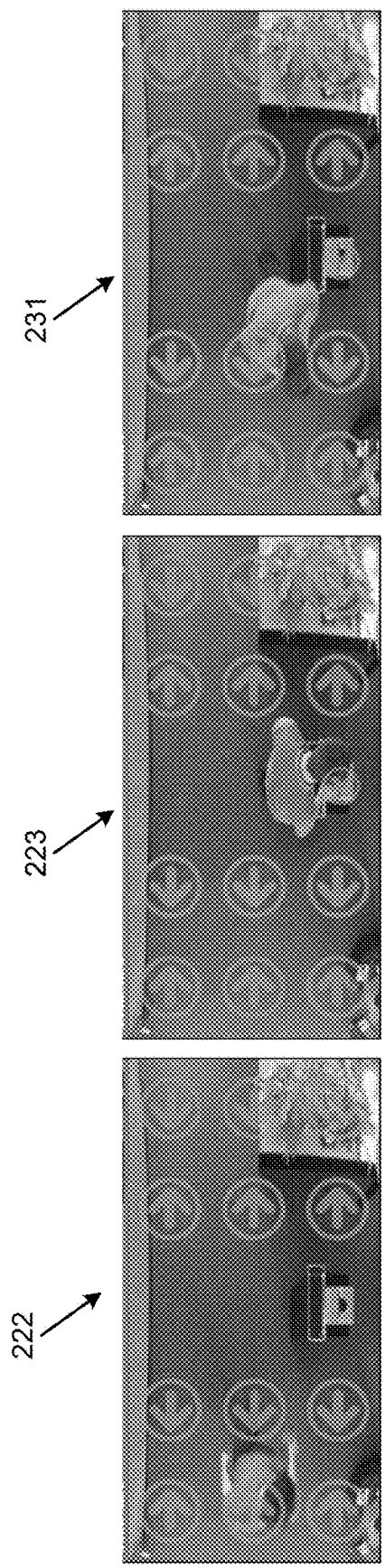

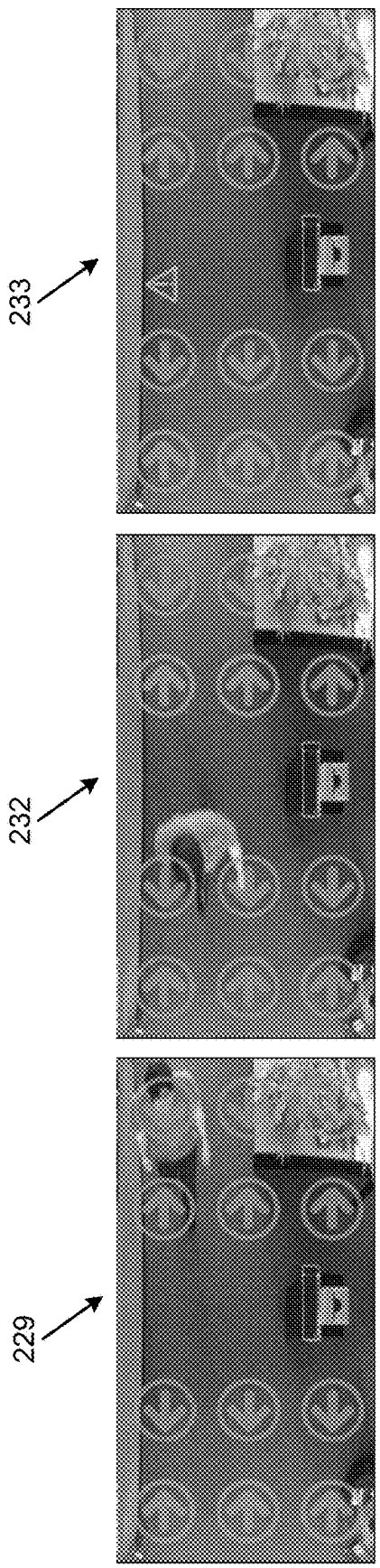

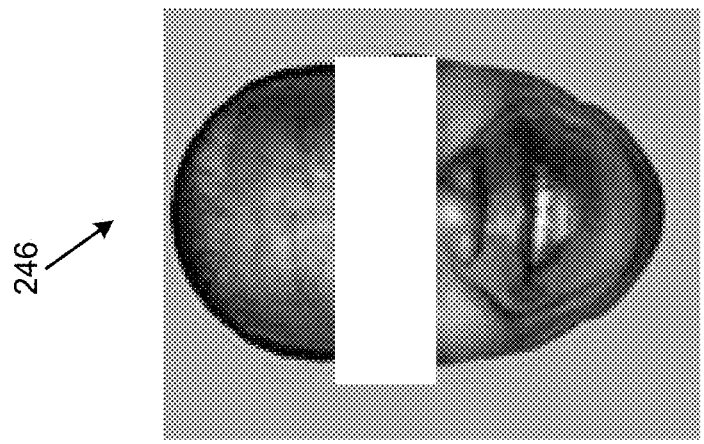
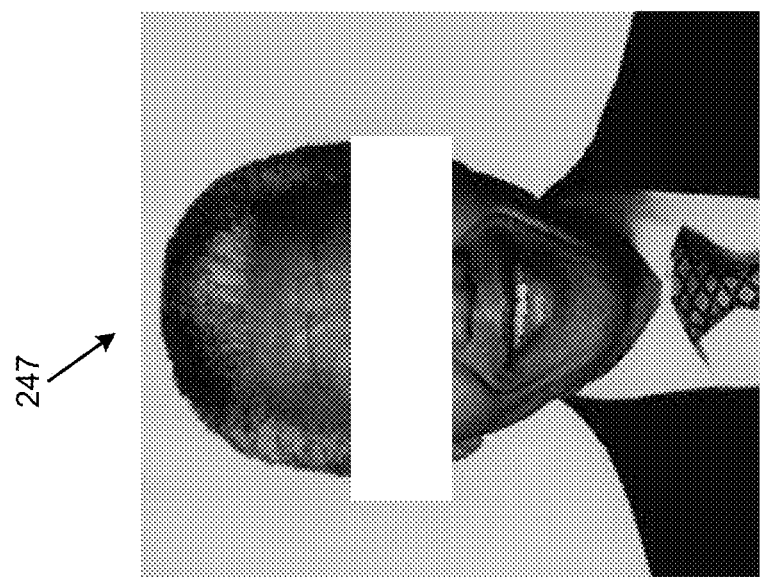
Fig. 23

US 10,453,278 B2

VIRTUAL ACCESS CONTROL

BACKGROUND

Detection and control of entry of people into a secured area typically requires setup of infrastructure that can include controlled passages with locked gates or doors. The locked gates or doors can cause delay in entry or exit of people, for example, if a large number of people are to enter and exit through an area. Thus, such types of infrastructure can limit throughput, and in certain environments, setup of such physical infrastructure can be prohibitive.

BRIEF DESCRIPTION OF DRAWINGS

Features of the present disclosure are illustrated by way of examples shown in the following figures. In the following figures, like numerals indicate like elements, in which:

FIG. 2A illustrates a physical setup for the virtual access control system, according to an example of the present disclosure;

FIGS. 11A, 11B and 11C illustrate stages of a single person accept scenario displayed on the GUI for the virtual access control system, according to an example of the present disclosure;

FIGS. 13A, 13B and 13C illustrate unacceptable stages of a scenario for an unidentified single person, displayed on the GUI for the virtual access control system, according to an example of the present disclosure;

FIGS. 15A, 15B and 15C illustrate acceptable stages of a scenario for rejection of authentication of a single person, displayed on the GUI for the virtual access control system, according to an example of the present disclosure;

FIGS. 17A, 17B and 17C illustrate unacceptable stages of a scenario for a wrong way single person, displayed on the GUI for the virtual access control system, according to an example of the present disclosure;

FIGS. 19A, 19B and 19C illustrate stages of an error scenario, displayed on the GUI for the virtual access control system, according to an example of the present disclosure;

FIG. 23 illustrates positioning of a 3D face of an individual adjacent a 2D image and/or a potential 2D probe image of the individual, according to an example of the present disclosure;

DETAILED DESCRIPTION

Figure 1:
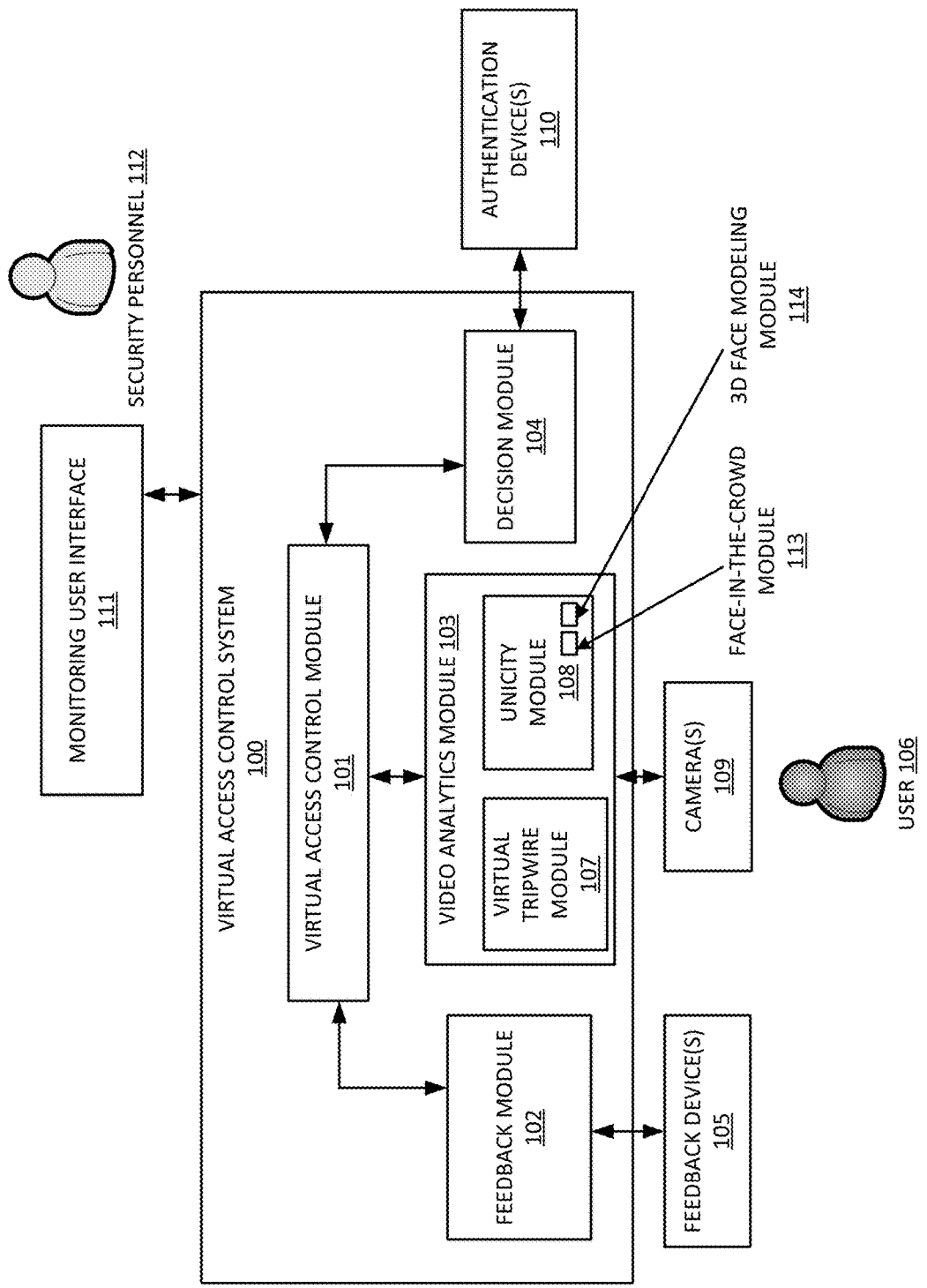
FIG. 1 illustrates an architecture of a virtual access control system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to an example, a method for virtual access control disclosed herein may include detecting entry of a person into a virtual controlled zone, and counting and/or identifying people including the person entering into the virtual controlled zone. The method for virtual access control disclosed herein may further include determining, by a processor, an authorization of the person to continue through the virtual controlled zone based on a facial identification of the person, and alerting the person to stop, exit from (e.g., exit virtual controlled zone from entry point), or continue through the virtual controlled zone based on the determined authorization. An alarm may be generated if the person violates directions provided by the alert.

According to another example, a virtual access control system disclosed herein may include a memory storing machine readable instructions to detect entry of a person into a virtual controlled zone, and count and/or identify people including the person entering into the virtual controlled zone. The machine readable instructions may further determine an authorization of the person to continue through the virtual controlled zone based on a facial and/or an information based identification of the person, and alert the person to stop, exit from, or continue through the virtual controlled zone based on the determined authorization. The machine readable instructions may further generate an alarm if the person violates directions provided by the alert. A processor may implement the machine readable instructions.

The virtual access control system provides a virtual access gate that may be less intrusive to operate and use for allowing authorized people to pass through an area. The virtual access gate also provides faster throughput compared to physical gates and doors, while still enforcing access control, flow control and counting. The virtual access gate may be used in conditions where a good approximation of entered users is necessary or in situations where access control is needed but security is not critical. Examples of such conditions may include fair and public event access areas, enterprise access to mid security critical areas, entering and leaving mass transit areas, boarding or leaving an airplane, and lounges of clubs, hotels, airports etc.

The system and method described herein provide a technical solution to the technical problem of controlling access of people to a secured area. In many instances, physical gates or doors are needed to control access of people to or from a secured area. Without such physical gates or doors, security personnel are typically used to control access of people to or from the secured area. The system and method described herein provide the technical solution of controlling access of people to or from a secured area without the need for such physical gates or doors, and without the need for security personnel. While security personnel may be used to monitor access of people to or from the secured area, the system and method guide entry and exit of people to or from the secured area, and provide for authentication of people before allowing entry into the secured area.

FIG. 1 illustrates an architecture of a virtual access control system 100, according to an example of the present disclosure. The virtual access control system 100 may generally include a virtual access control module 101 to control operation of a feedback module 102, a video analytics module 103, and a decision module 104. The feedback module 102 may monitor and control operation of feedback devices 105, such as, for example, floor/wall lighting and audio feedback devices to indicate to people (e.g., user 106 of the virtual access control system 100) whether to stop, exit from, or continue through a secured area. The video analytics module 103 may include a virtual tripwire module 107 to detect when the user 106 has entered or departed from a monitoring zone of the virtual access control system 100. The video analytics module 103 may include a unicity module 108 to detect and count users 106 to ensure every user is positively identified before passing through a monitoring zone of the virtual access control system 100. The virtual tripwire module 107 and the unicity module 108 may use cameras 109 and other motion, face and/or user detection devices for the detection and counting of users 106. The decision module 104 may use authentication devices 110 for identity recognition of users 106. For example, the authentication devices 110 may include kiosk-based devices for stop-and-interact identity recognition (e.g., scan e-passport, look at camera, other biometric identification techniques, etc.), or remotely positioned devices for on-the-fly identity recognition at a distance (e.g., a camera capturing and matching faces against a list of authorized users), which can apply to single users, or multiple users at the same time. A monitoring user interface 111 may include, for example, a graphical user interface (GUI) for facilitating supervision of operations and intervening by security personnel 112 in case of incidents (e.g., a user not recognized, a user going forward despite video/audio feedback to go back, or in exceptional situations etc.).

As described herein, the modules and other elements of the system 100 may comprise machine readable instructions stored on a non-transitory computer readable medium. In addition, or alternatively, the modules and other elements of the system 100 may comprise hardware or a combination of machine readable instructions and hardware.

Figure 2B:
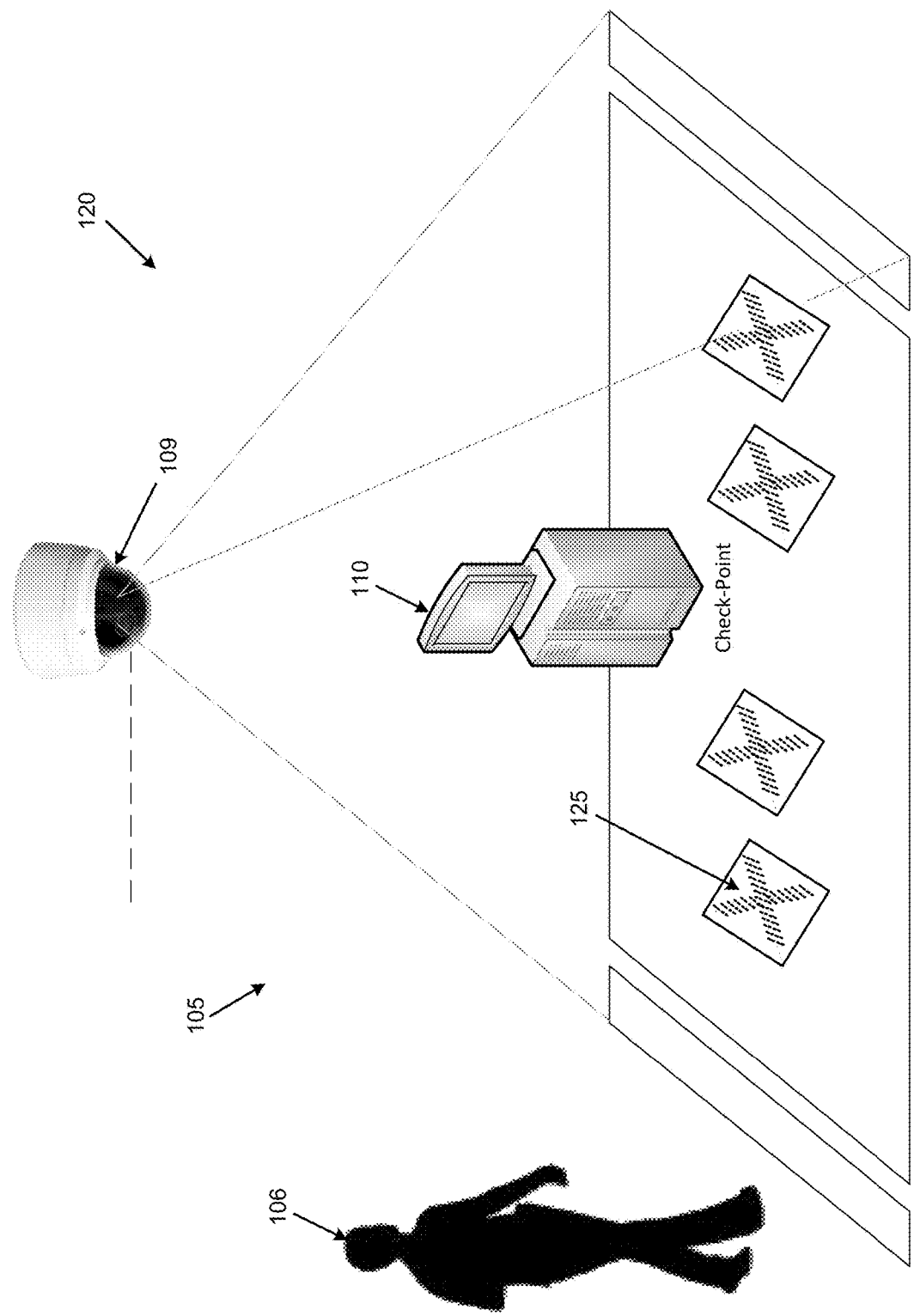
FIG. 2B illustrates another physical setup for the virtual access control system, according to an example of the present disclosure.

FIG. 2A illustrates a physical setup 120 for the virtual access control system 100, according to an example of the present disclosure. The physical setup 120 may generally include the camera 109, the feedback devices 105 that include primary entry lights 121, primary exit lights 122, secondary exit lights 123, and secondary entry lights 124. The physical setup 120 may further include the authentication device 110, which is shown as a kiosk-based devices for stop-and-interact identity recognition of the user 106. Instead of the lights as shown, a variety of other methods may be used to provide feedback to a user. For example, other visible, audible or sensory devices may be used to provide user feedback. For example, as shown in FIG. 2B, floor tiles with directional flow control lights may be added on the floor to control the flow of users 106 with red crosses to prohibit access and green arrows to allow access. For example, one-half of the X 125 of FIG. 2B may be highlighted in green or red (or in another color) to function as an arrow (e.g., with the arrow head shown) to respectively permit and prohibit movement in a predetermined direction.

Figure 3:
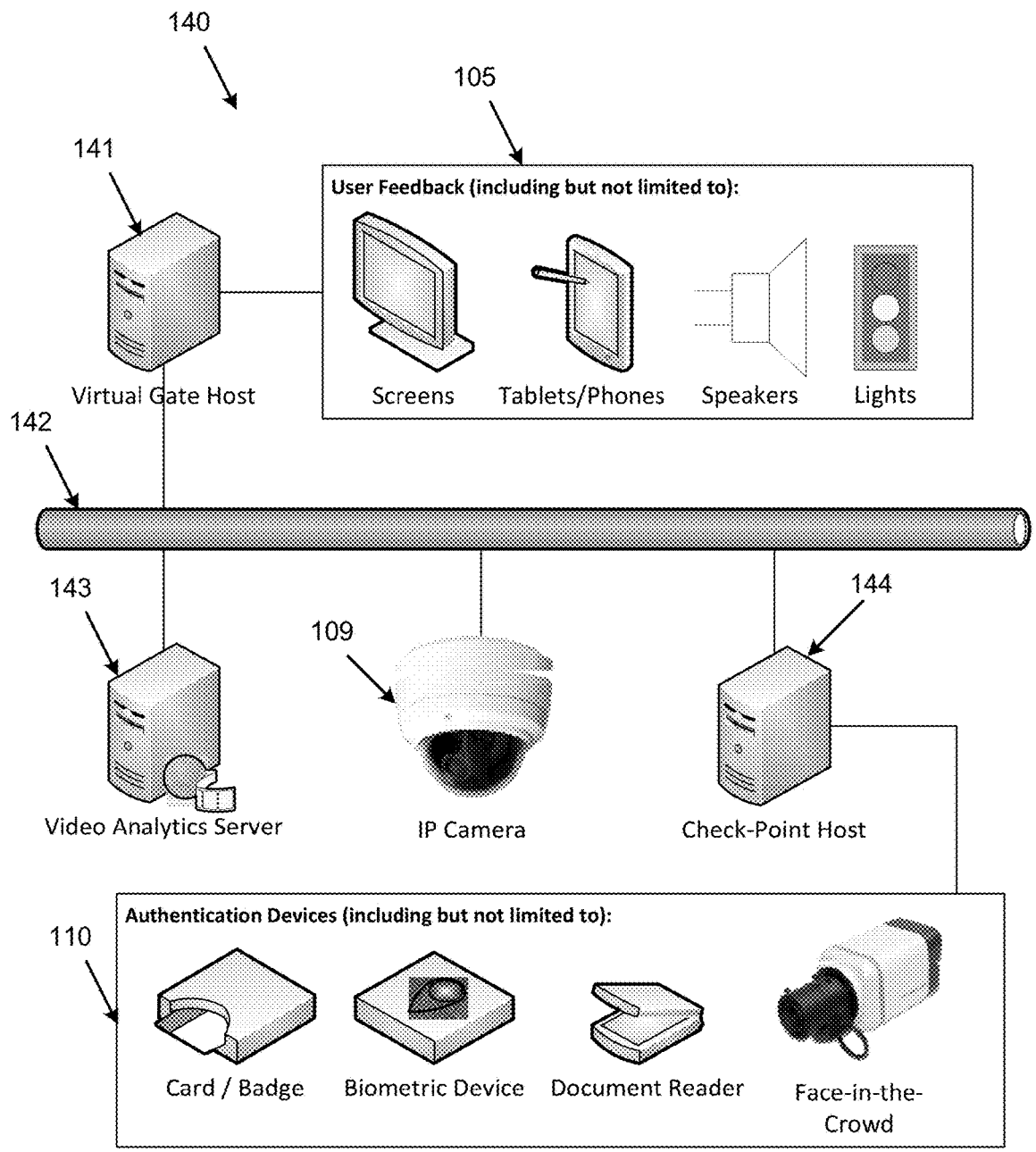
FIG. 3 illustrates technical architecture for the virtual access control system, according to an example of the present disclosure.

FIG. 3 illustrates technical architecture 140 for the virtual access control system 100, according to an example of the present disclosure. The technical architecture 140 may generally include a virtual gate host 141, which may provide for operation of the virtual access control module 101 to control operation of the feedback module 102, the video analytics module 103, and the decision module 104. The virtual gate host 141 may be connected by a communication bus 142 to a video analytics server 143 which may provide for operation of the video analytics module 103. A check-point host 144 may be provided for operation of the decision module 104 that uses authentication devices 110 for identity recognition.

Figure 4:
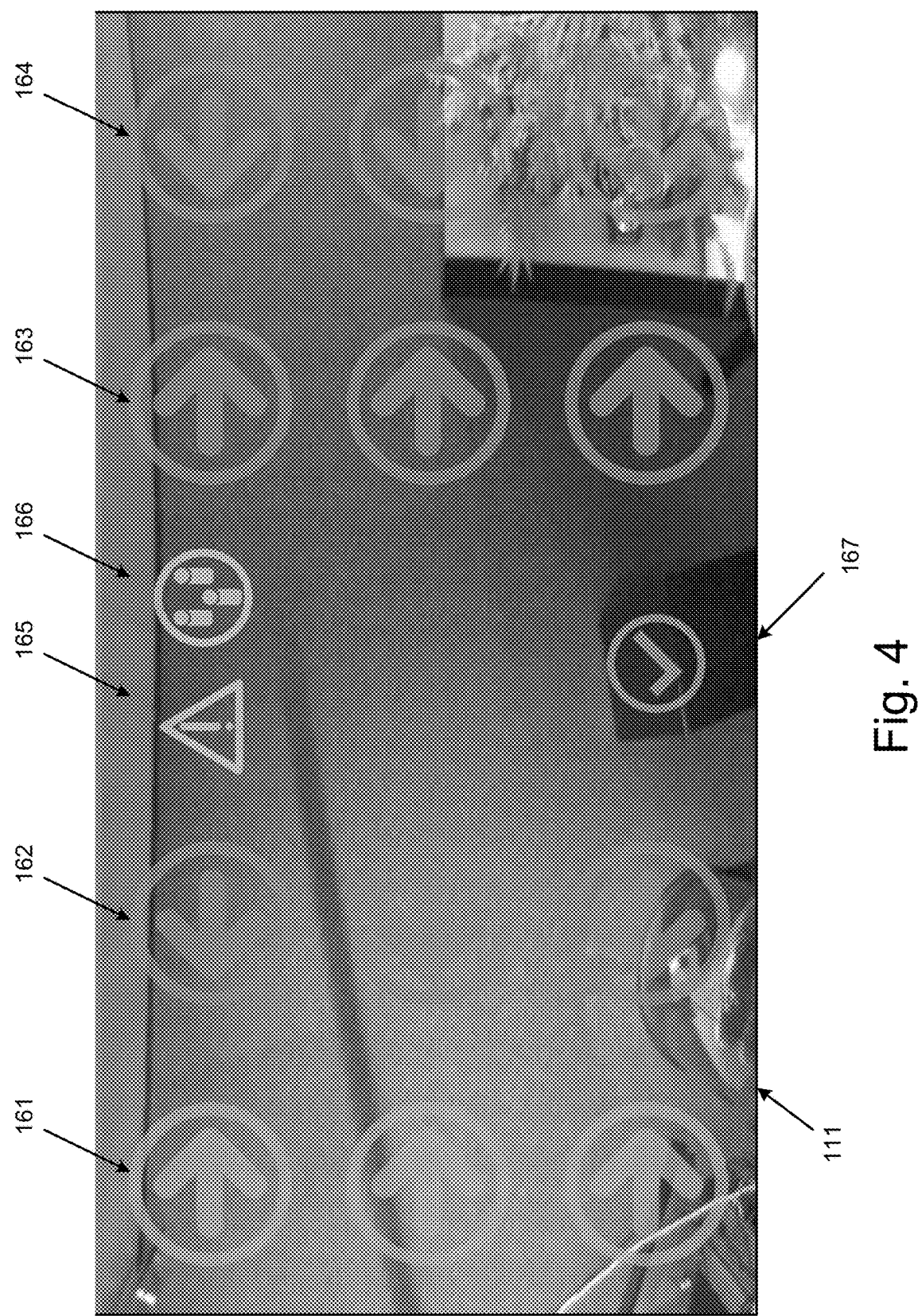
FIG. 4 illustrates a display for a monitoring graphical user interface (GUI) for the virtual access control system, according to an example of the present disclosure.

FIG. 4 illustrates a display for the monitoring user interface 111 for the virtual access control system 100, according to an example of the present disclosure. Referring to FIGS. 2A and 4, the monitoring user interface 111 may generally include primary entry directional arrows 161 that correspond to the primary entry lights 121, primary exit directional arrows 162 that correspond to the primary exit lights 122, secondary exit directional arrows 163 that correspond to the secondary exit lights 123, and secondary entry directional arrows 164 that correspond to the secondary entry lights 124. The arrows 161-164 may be color coded, for example, green or red, to respectively allow or deny entry or exit. An alarm sign 165 may be displayed when an alarm is raised (e.g., access not allowed, wrong way or error alarm). An overcrowded sign 166 may be displayed when there is more than one user inside the area monitored and controlled by the virtual access control system 100. An accepted or rejected sign 167 may be displayed respectively as a check as shown in FIG. 4 for authenticating a user or an "X" mark for denying authentication to a user based on feedback from the decision module 104.

Figure 5:
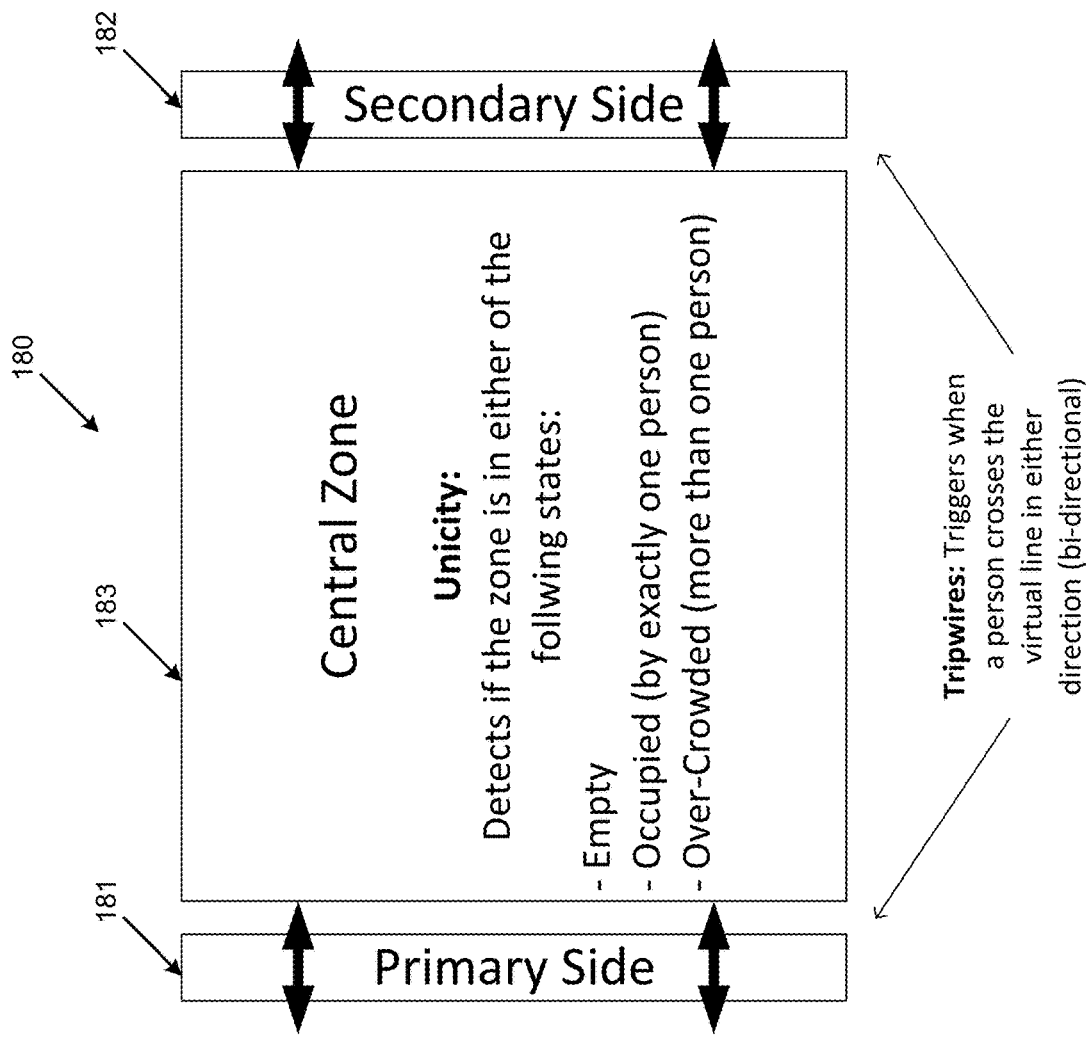
FIG. 5 illustrates an example of a layout for operation of video analytics for the virtual access control system, according to an example of the present disclosure.

FIG. 5 illustrates an example of a layout for operation of video analytics for the virtual access control system 100, according to an example of the present disclosure. For a zone 180 monitored and controlled by the virtual access control system 100, the zone 180 may include primary and secondary sides 181, 182, respectively, where the user 106 may enter or exit. The primary side 181 may be designated based on a typical entry/exit point, whereas the secondary side 182 may be designated by a less frequently used or a prohibited entry/exit point. The virtual tripwire module 107 may monitor the primary and secondary sides 181, 182 of the zone 180 by setting triggers based on input from the camera 109 when a user crosses a virtual line of zones defined by the area of coverage of the primary and secondary sides 181, 182, in either direction (e.g., left or right side in the orientation of FIG. 5). The primary side 181 allows a user to enter/exit the primary side of a virtual access gate operated by the virtual access control system 100. The secondary side 182 allows a user to enter/exit the secondary side of a virtual access gate operated by the virtual access control system 100. A central zone 183 may be designated where the unicity module 108 detects if the zone is either in an empty state, an occupied state (i.e., exactly one person in the central zone 183), or an over-crowded state (i.e., more than one person in the central zone 183). The central zone 183 thus facilitates the counting of the number of people inside a virtual access gate operated by the virtual access control system 100 and provides for display of information such as alarms, overcrowded alerts, decision feedback etc., at the monitoring user interface 111. For bi-directional operation of the virtual access control system 100 (i.e., sides 181 and 182 are both designated primary entry/exit sides), the virtual access control system 100 may thus allow users to enter/exit from either the side 181 or the side 182, and exit accordingly, with the central zone 183 functioning in a similar manner as discussed herein.

Figure 6:
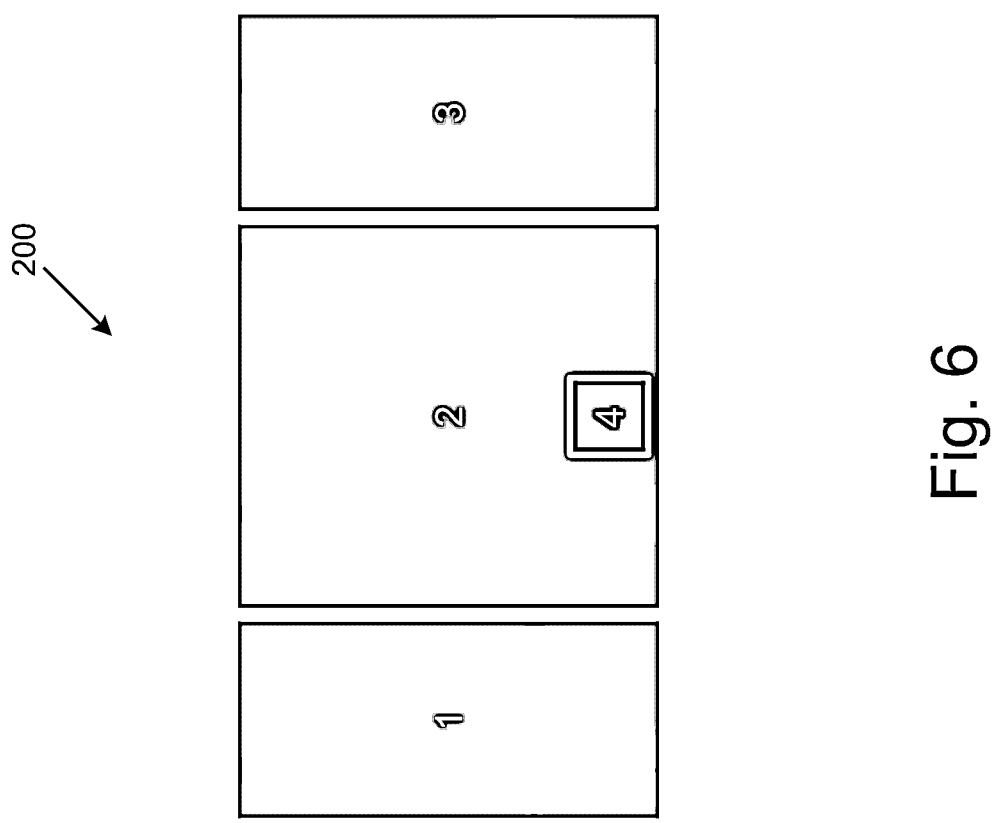
FIG. 6 illustrates a zone layout for the virtual access control system, according to an example of the present disclosure.

FIG. 6 illustrates a zone layout 200 for the virtual access control system 100, according to an example of the present disclosure. The zone layout 200 may generally include zones 1-4, which respectively correspond to the primary side 181 of FIG. 5, the central zone 183, the secondary side 182, and the zone of location of the authentication devices 110. The zone layout 200 may be used for facilitating operation of the virtual access control system 100, for example, by triggering feedback to security personnel 112 as to which zones require attention. For example, the zone designations 1-4 may be used to provide feedback to the security personnel 112, where the security personnel 112 may readily recognize a zone of concern based a visual display at the monitoring user interface 111, or another form of audible signal that specifies a zone number (e.g. 1-4) for the zone of concern.

As discussed above, the video analytics module 103 may include the unicity module 108 to detect and count people to ensure every individual is positively identified before passing through a monitoring zone (i.e., the central zone 183) of the virtual access control system 100. Referring to FIG. 5, the unicity module 108 may detect and count people by using a predetermined average area of a person's head from a downward pointing camera 109 to determine how much total area of the central zone 183 is obscured. For example, if an average area covered by a person's head is $X\ m^2$, then the unicity module 108 may determine the number of people in the central zone 183 by determining how much of the total area of the central zone 183 is obscured and dividing by the average area covered by a person's head. Alternatively, the unicity module 108 may also use an overall average area covered by a person's torso when viewed downwards to detect and count people. The unicity module 108 may also detect and count people based on detection of other body parts, such as, for example, shoulders etc. The unicity module 108 may operate in conjunction with a face-in-the crowd module 113 that detects faces of individuals to thus compare and confirm the detection of people based on comparison of a person's head. For example, the unicity module 108 may operate in conjunction with the face-in-the crowd system described in co-ending and commonly owned U.S. patent application Ser. No. 13/753,847 titled "System and Method for Face Capture and Matching", the disclosure of which is incorporated by reference in its entirety. The virtual access control system 100 may also control a large or predetermined number of people based on the unicity module 108 by allowing a predetermined number of people to enter and depart from the central zone 183. The number of people that are counted entering and exiting the primary and secondary sides 181, 182, and within the central zone 183, may be used by the virtual access control module 101 as multiple accuracy checks at various points of operation of the virtual access control system 100. The unicity module 108 may also use other methods, such as, for example, counting the difference between enter and exit signals from the primary and secondary sides 181, 182, or detecting and counting distinct features of people (e.g., counting the number of ears or eyes visible).

Figure 7:
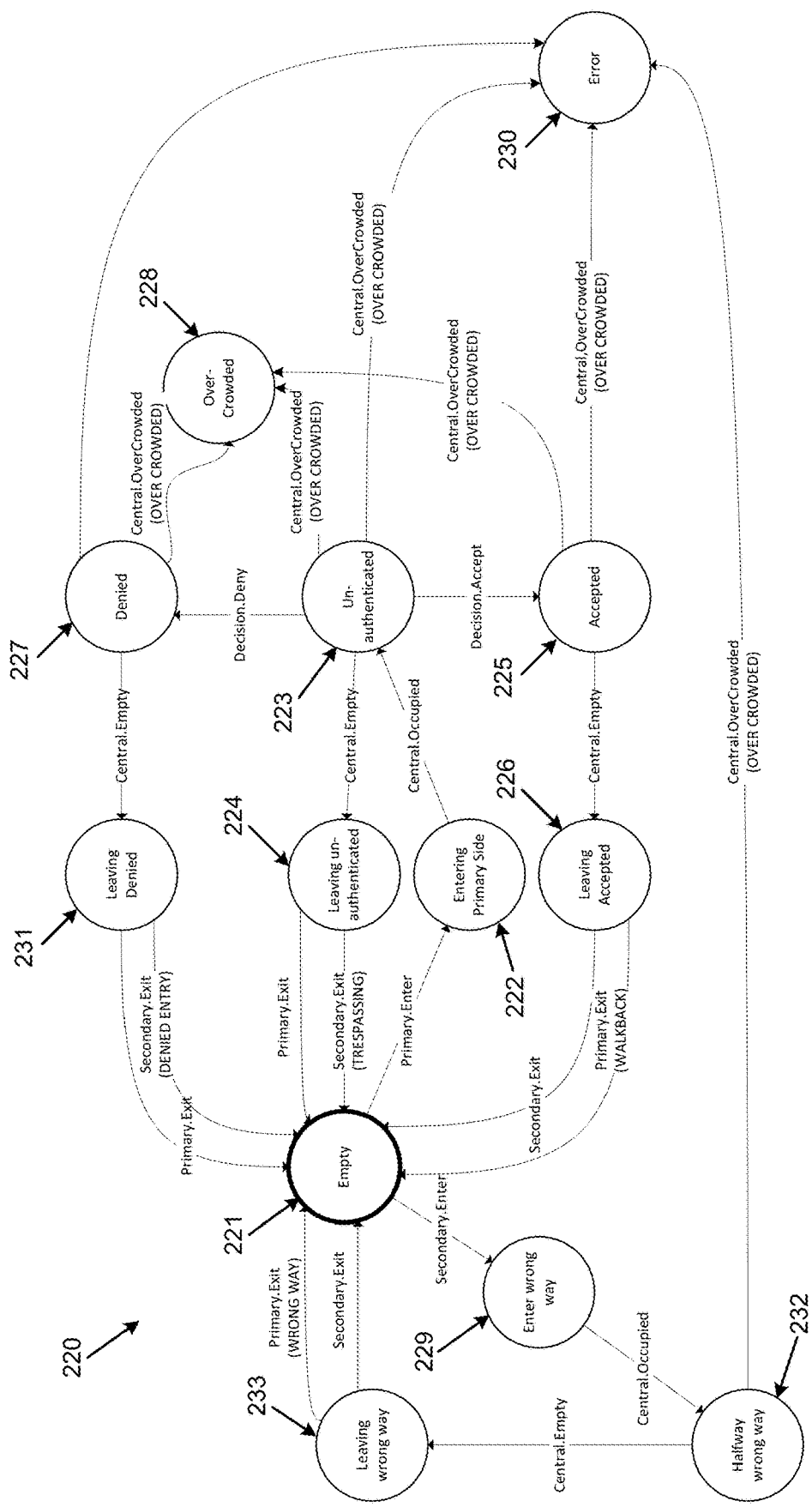
FIG. 7 illustrates a virtual access control state diagram for the virtual access control system, according to an example of the present disclosure.

FIG. 7 illustrates a virtual access control state diagram 220 for the virtual access control system 100, according to an example of the present disclosure. The state diagram 220 illustrates operational logic of the virtual access control system 100. The various states illustrated in the state diagram 220 are illustrated in FIGS. 8A-19C. Transitions in the state diagram 220 may begin at state 221, the empty state of the central zone 183 of FIG. 5. The different signals that may be received at the virtual access control module 101 from the feedback module 102, the video analytics module 103 and the decision module 104 include "Primary Enter", "Primary Exit", "Secondary Enter", "Secondary Exit", "Central Empty", "Central Occupied", "Central Over-Crowded", "Decision Accept" and "Decision Deny". Any alert generated at the monitoring user interface 111 is illustrated in parenthesis on the state diagram 220. For example, beginning at the empty state 221, a person entering from the primary side 181 of FIG. 5 triggers a Primary Enter signal and the virtual access control module 101 proceeds to entering primary side state 222. Once the person is in the central zone 183, this triggers a Central Occupied signal, at which time the person is considered unauthenticated by the decision module 104 and the virtual access control module 101 proceeds to unauthenticated state 223. If a signal is detected that the central zone 183 is Central Empty, this means that the person was not authenticated by the decision module 104, which triggers the Central Empty signal and the virtual access control module 101 proceeds to leaving unauthenticated state 224. Finally, if a Secondary Exit signal is detected, this triggers a "TRESSPASSING" alert at the monitoring user interface 111 and the virtual access control module 101 returns to the empty state 221.

In another scenario that corresponds to a single person accept scenario of FIGS. 11A, 11B and 11C that does not generate an alert at the monitoring user interface 111, referring to FIGS. 7 and 11A, beginning at the empty state 221, a person entering from the primary side 181 of FIG. 5 triggers a Primary Enter signal and the virtual access control module 101 proceeds to entering primary side state 222. The primary entry lights 121 of FIG. 2A may be highlighted green and the remaining lights may be highlighted red. At FIG. 11B, once the person is in the central zone 183, this triggers a Central Occupied signal, at which time the person is considered unauthenticated by the decision module 104 and the virtual access control module 101 proceeds to the unauthenticated state 223. The primary exit lights 122 of FIG. 2A may be highlighted green and the remaining lights may be highlighted red. Referring to FIG. 11C, if a Decision Accept signal is detect, this means that the person was properly authenticated by the decision module 104, and the virtual access control module 101 proceeds to accepted state 225. Referring to FIG. 11C, once the person exits towards the right side of FIG. 11C towards the secondary side 182 of FIG. 5, this triggers a Central Empty signal and the virtual access control module 101 proceeds to leaving accepted state at 226. The secondary exit lights 123 of FIG. 2A may be highlighted green and the remaining lights may be highlighted red. Finally, once the person exits from the secondary side 182, this triggers a Secondary Exit signal and the virtual access control module 101 returns to the empty state 221.

Referring to FIGS. 7 and 8A-19C, the various states shown in FIG. 7 are illustrated in FIGS. 8A-19C.

Figure 8A:
FIGS. 8A and 8B respectively illustrate empty and occupied states displayed on the GUI for the virtual access control system, according to an example of the present disclosure.
Figure 8B:

For example, FIGS. 8A and 8B respectively illustrate empty and occupied states displayed on the monitoring user interface 111 for the virtual access control system 100, according to an example of the present disclosure. Referring to FIGS. 7 and 8A, the empty state illustration of FIG. 8A corresponds to the empty state 221 where no one is within the monitoring zone of the virtual access control system 100. In the empty state of FIG. 8A, a user 106 may enter from the primary side 181 of FIG. 5. The primary entry lights 121 of FIG. 2A may be highlighted green and the remaining lights may be highlighted red. Referring to FIGS. 7 and 8B, the occupied state illustration of FIG. 8B corresponds to the unauthenticated state 223, as well as the accepted and denied states 225 and 227 where a person is still present in the central zone 183. The occupied state illustration of FIG. 8B also corresponds to over-crowded state 228 if multiple people are within the central zone 183. In the occupied state of FIG. 8B, a user is within the monitoring zone of the virtual access control system 100. If the user is not identified, the user is allowed to go back, and no one else is allowed to enter the monitoring zone of the virtual access control system 100. The primary exit lights 122 of FIG. 2A may be highlighted green and the remaining lights may be highlighted red.

Figure 9A:
FIGS. 9A and 9B respectively illustrate accepted and rejected states displayed on the GUI for the virtual access control system, according to an example of the present disclosure.
Figure 9B:

FIGS. 9A and 9B respectively illustrate accepted and rejected states displayed on the monitoring user interface 111 for the virtual access control system 100, according to an example of the present disclosure. Referring to FIGS. 7 and 9A, the accepted state illustration corresponds to the accepted state 225 of the virtual access control module 101. In the accepted state 225, a user inside the central zone 183 has been identified and may exit through the secondary side 182. No one else is allowed to enter the monitoring zone of the virtual access control system 100. The secondary exit lights 123 of FIG. 2A may be highlighted green and the remaining lights may be highlighted red. Referring to FIGS. 7 and 9B, the rejected state illustration corresponds to the denied state 227 of the virtual access control module 101. In the denied state 227, a user inside the central zone 183 has not been identified and may not exit through the secondary side 182, but has to return through the primary side 181. No one else is allowed to enter the monitoring zone of the virtual access control system 100. The primary exit lights 122 of FIG. 2A may be highlighted green and the remaining lights may be highlighted red.

Figure 10A:
FIGS. 10A and 10B respectively illustrate wrong way and error states displayed on the GUI for the virtual access control system, according to an example of the present disclosure.
Figure 10B:

FIGS. 10A and 10B respectively illustrate wrong way and error states displayed on the monitoring user interface 111 for the virtual access control system 100, according to an example of the present disclosure. Referring to FIGS. 7 and 10A, the wrong way state illustration corresponds to an enter wrong way state 229 of the virtual access control module 101. In the enter wrong way state 229, a user enters the central zone 183 from the secondary side 182 and must exit through the secondary side 182. The secondary exit lights 123 of FIG. 2A may be highlighted green and the remaining lights may be highlighted red. Referring to FIGS. 7 and 9B, the error state illustration corresponds to error state 230 of the virtual access control module 101. In the error state 230, people may be entering from both the primary and secondary sides 181, 182, and meeting in the central zone 183. No one is allowed to exit the monitoring zone of the virtual access control system 100 unless permission is granted by the security personnel 112. All lights of FIG. 2A may be red to prevent entry or exit.

Figure 12B:
FIGS. 12A and 12B illustrate acceptable stages of a scenario for an unidentified single person, displayed on the GUI for the virtual access control system, according to an example of the present disclosure.
Figure 12A:
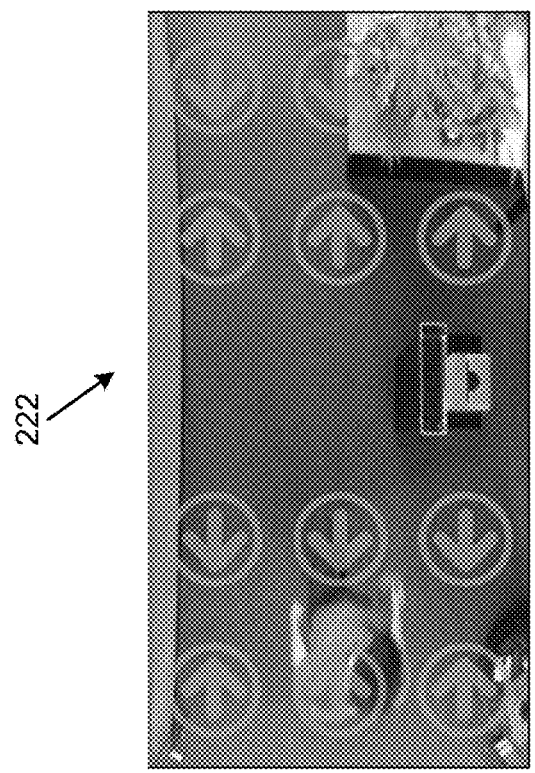

FIGS. 12A and 12B illustrate acceptable stages of a scenario for an unidentified single person, displayed on the monitoring user interface 111 for the virtual access control system 100, according to an example of the present disclosure. Referring to FIGS. 7 and 12A, a single person (e.g., the user 106) enters the central zone 183 from the primary side 181, which corresponds to the entering primary side state 222. Initially, the primary entry lights 121 of FIG. 2A may be highlighted green and the remaining lights may be highlighted red. Referring to FIG. 12B, the person may stop in the central zone 183 and exit from the primary side 181, which corresponds to the leaving unauthenticated state 224. The primary exit lights 122 of FIG. 2A may be highlighted green and the remaining lights may be highlighted red. Finally, the person exits from the primary side 181, which triggers a Primary Exit signal and corresponds to the empty state 221. This scenario triggers no alerts at the monitoring user interface 111.

FIGS. 13A, 13B and 13C illustrate unacceptable stages of a scenario for an unidentified single person, displayed on the monitoring user interface 111 for the virtual access control system 100, according to an example of the present disclosure. Referring to FIGS. 7 and 13A, a single person enters the central zone 183 from the primary side 181, which corresponds to the entering primary side state 222. Initially, the primary entry lights 121 of FIG. 2A may be highlighted green and the remaining lights may be highlighted red. Referring to FIGS. 13B and 13C, the person continues through the central zone 183 without stopping and exits through the secondary side 182. This triggers the alarm sign 165 (see FIG. 4). The person's progress from the entering primary side state 222 to the exit from the secondary side 182 corresponds to the unauthenticated state 223 and the leaving unauthenticated state 224 after which a Secondary Exit signal triggers a TRESSPASSING alert on the monitoring user interface 111.

Figure 14B:
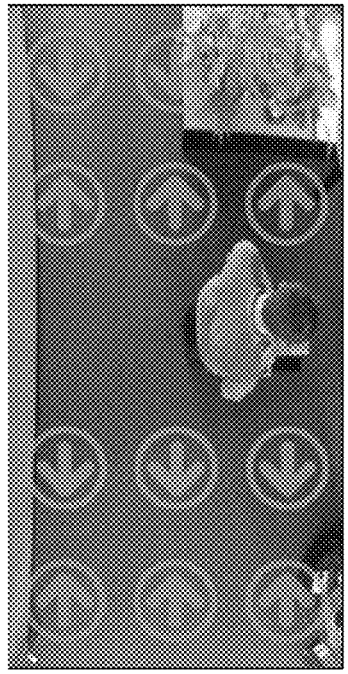
FIGS. 14A-14D illustrate unacceptable stages of a scenario for rejection of authentication of a single person, displayed on the GUI for the virtual access control system, according to an example of the present disclosure.
Figure 14D:
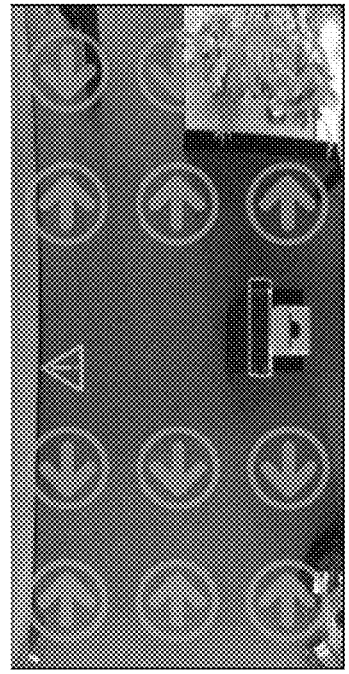
Figure 14A:
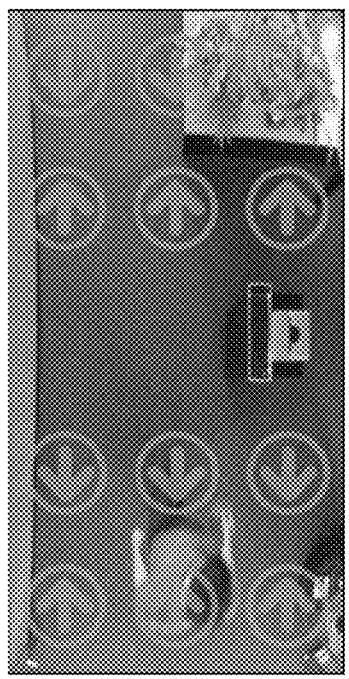
Figure 14C:
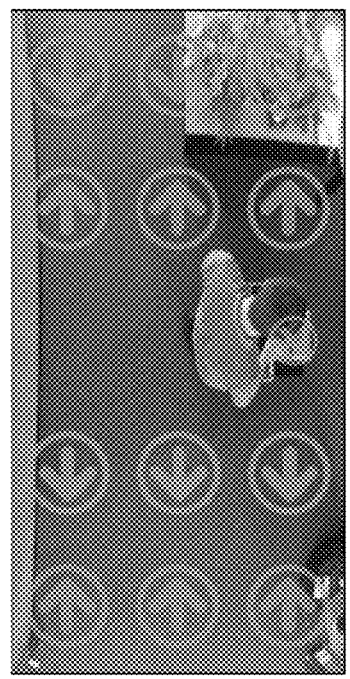

FIGS. 14A-14D illustrate unacceptable stages of a scenario for rejection of authentication of a single person, displayed on the monitoring user interface 111 for the virtual access control system 100, according to an example of the present disclosure. Referring to FIGS. 7 and 14A, a single person enters the central zone 183 from the primary side 181, which corresponds to the entering primary side state 222. Initially, the primary entry lights 121 of FIG. 2A may be highlighted green and the remaining lights may be highlighted red. Referring to FIGS. 7 and 14B, the person stops at the central zone 183 for authentication, which corresponds to the unauthenticated state 223 of FIG. 7. At FIG. 14C, the person's entry is rejected by the decision module 104, which corresponds to the denied state 227 of FIG. 7. The primary exit lights 122 of FIG. 2A may be highlighted green and the remaining lights may be highlighted red. At FIG. 14D, the person exits through the secondary side 182. This triggers the alarm sign 165 (see FIG. 4). The person's exit from the secondary side 182 corresponds to a leaving denied state 231 after which a Secondary Exit signal triggers a DENIED ENTRY alert on the monitoring user interface 111.

FIGS. 15A, 15B and 15C illustrate acceptable stages of a scenario for rejection of authentication of a single person, displayed on the monitoring user interface 111 for the virtual access control system 100, according to an example of the present disclosure. Referring to FIGS. 7 and 15A, a single person enters the central zone 183 from the primary side 181, which corresponds to the entering primary side state 222. Initially, the primary entry lights 121 of FIG. 2A may be highlighted green and the remaining lights may be highlighted red. Referring to FIGS. 7 and 15B, the person stops at the central zone 183 for authentication, which corresponds to the unauthenticated state 223 of FIG. 7. At FIG. 15B, the person's entry is rejected by the decision module 104, which corresponds to the denied state 227 of FIG. 7. The primary exit lights 122 of FIG. 2A may be highlighted green and the remaining lights may be highlighted red. At FIG. 15C, the person exits through the primary side 181. Since this is an acceptable exit, no alarm is triggered. The person's exit from the primary side 181 corresponds to a leaving denied state 231 after which a Primary Exit signal indicates that no alarm is to be triggered.

Figure 16B:
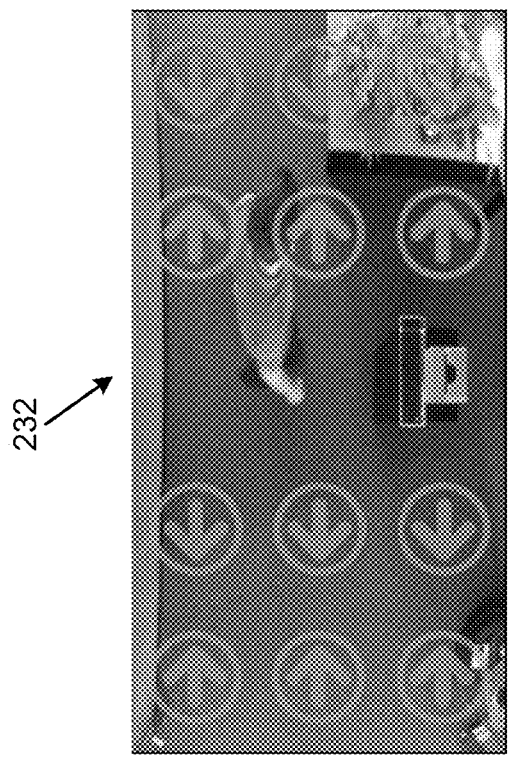
FIGS. 16A and 16B illustrate acceptable stages of a scenario for a wrong way single person, displayed on the GUI for the virtual access control system, according to an example of the present disclosure.
Figure 16A:
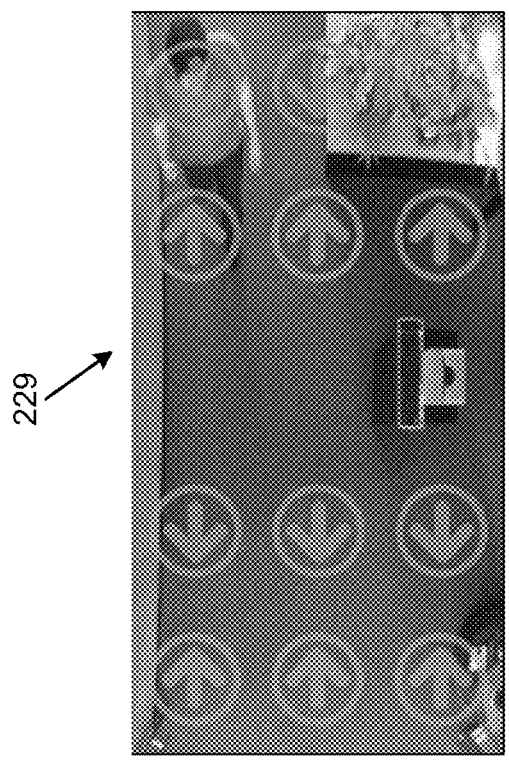

FIGS. 16A and 16B illustrate acceptable stages of a scenario for a wrong way single person, displayed on the monitoring user interface 111 for the virtual access control system 100, according to an example of the present disclosure. Referring to FIGS. 7 and 16A, a single person enters the central zone 183 from the secondary side 182, which corresponds to the enter wrong way state 229. Initially, the primary entry lights 121 of FIG. 2A may be highlighted green and the remaining lights may be highlighted red. Once the person enters through the secondary side 182, the secondary exit lights 123 of FIG. 2A may be highlighted green and the remaining lights may be highlighted red. Referring to FIGS. 7 and 16B, the person exits through the secondary side 182. Since this is an acceptable exit, no alarm is triggered. The person's exit from the secondary side 182 corresponds to a halfway wrong way state 232, then a leaving wrong way state 233, after which a Secondary Exit signal indicates that no alarm is to be triggered.

FIGS. 17A, 17B and 17C illustrate unacceptable stages of a scenario for a wrong way single person, displayed on the monitoring user interface 111 for the virtual access control system 100, according to an example of the present disclosure. Referring to FIGS. 7 and 17A, a single person enters the central zone 183 from the secondary side 182, which corresponds to the enter wrong way state 229. Initially, the primary entry lights 121 of FIG. 2A may be highlighted green and the remaining lights may be highlighted red. Once the person enters through the secondary side 182, as shown in FIG. 17B, the secondary exit lights 123 of FIG. 2A may be highlighted green and the remaining lights may be highlighted red. Referring to FIGS. 7 and 17C, the person exits through the primary side 181. Since this is not an acceptable entry or exit, a WRONG WAY alert is triggered. The person's exit from the primary side 181 corresponds to the halfway wrong way state 232, then the leaving wrong way state 233, after which a Primary Exit signal triggers a WRONG WAY alert at the monitoring user interface 111.

Figure 18B:
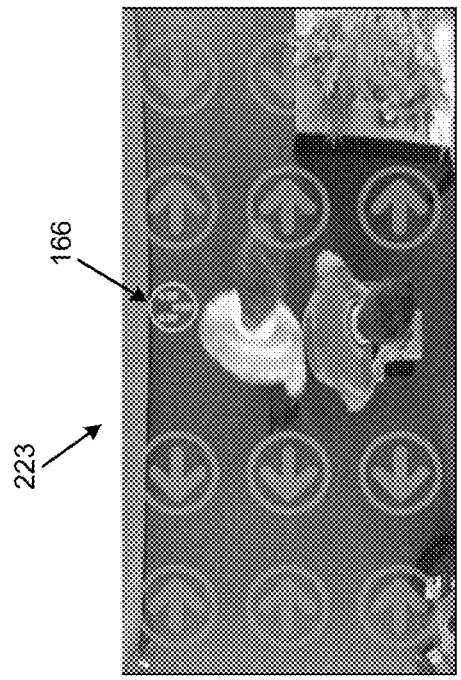
FIGS. 18A-18D illustrate stages of a tailgating scenario, displayed on the GUI for the virtual access control system, according to an example of the present disclosure.
Figure 18D:
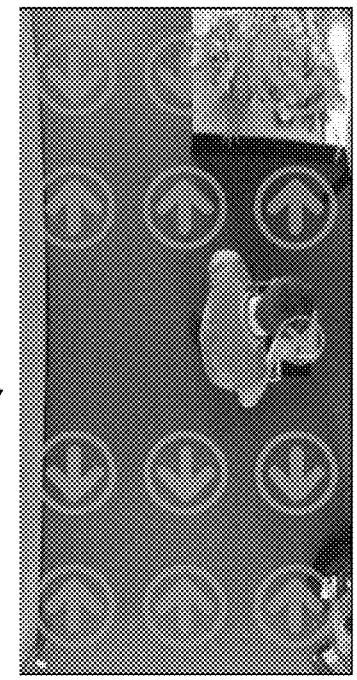
Figure 18A:
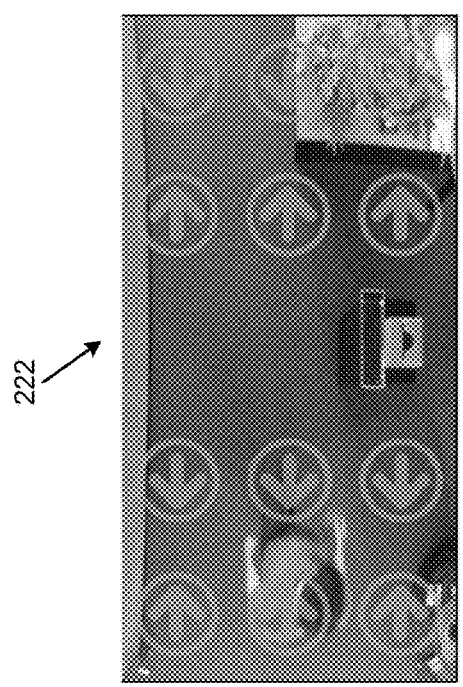
Figure 18C:
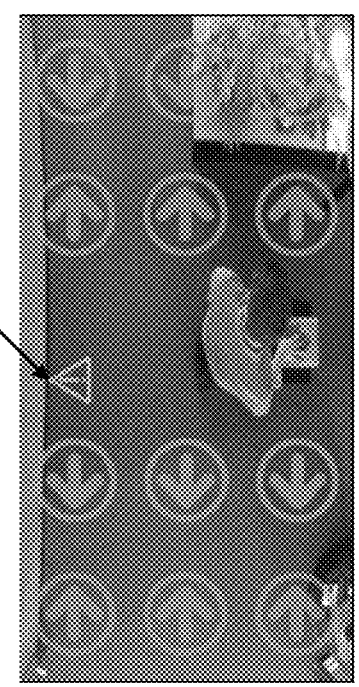

FIGS. 18A-18D illustrate stages of a tailgating scenario, displayed on the monitoring user interface 111 for the virtual access control system 100, according to an example of the present disclosure. Referring to FIGS. 7 and 18A, a single person enters the central zone 183 from the primary side 181, which corresponds to the entering primary side state 222. Initially, the primary entry lights 121 of FIG. 2A may be highlighted green and the remaining lights may be highlighted red. Referring to FIGS. 7 and 18B, the person stops at the central zone 183 for authentication, which corresponds to the unauthenticated state 223 of FIG. 7. As the person is being authenticated, a second person enters from the primary side 181, which triggers an overcrowded sign 166 (see FIG. 4), and further an alarm sign 165 as shown in FIG. 18C on the monitoring user interface 111. The overcrowded and alarm signs correspond to the error state 230 of FIG. 7. At FIG. 18D, the person's entry is rejected by the decision module 104, and an OVER CROWDED alert may be raised. Once the situation with the second person is addressed, for example, by security personnel 112, the first person may engage the authentication device 110 to re-start the identification process.

FIGS. 19A, 19B and 19C illustrate stages of an error scenario, displayed on the monitoring user interface 111 for the virtual access control system 100, according to an example of the present disclosure. Referring to FIGS. 7 and 19A, a single person enters the central zone 183 from the primary side 181, which corresponds to the entering primary side state 222. Initially, the primary entry lights 121 of FIG. 2A may be highlighted green and the remaining lights may be highlighted red. Once the person enters the central zone 183, at FIG. 19B, the primary exit lights 122 of FIG. 2A may be highlighted green and the remaining lights may be highlighted red. Referring to FIG. 19C, another person enters the central zone 183 form the secondary side 182. This triggers an overcrowded sign 166 on the monitoring user interface 111. For FIG. 19C, all lights of FIG. 2A may be highlighted red. This scenario corresponds to the error state 230 of FIG. 7 and an OVER CROWDED alert may be raised on the monitoring user interface 111.

As discussed above, the unicity module 108 may operate in conjunction with the face-in-the crowd module 113 that detects faces of individuals to thus compare and confirm the detection of people based on comparison of a person's head. Additionally or alternatively, with respect to detection of faces of individuals, the unicity module 108 may also operate in conjunction with a three-dimensional (3D) face modeling module 114 that generates frontal images from angled faces Through a 3D face modeling process. The 3D face modeling module 114 may use, for example, the CYBER EXTRUDER AUREUS 3D face modeling process for generation of 3D face models. The 3D face modeling process may be used as a pre-processing step for face recognition by the face-in-the crowd module 113. Further, the 3D face modeling process may be used for human adjudication as well as for face detection based on 3D modeling.

Figure 20:
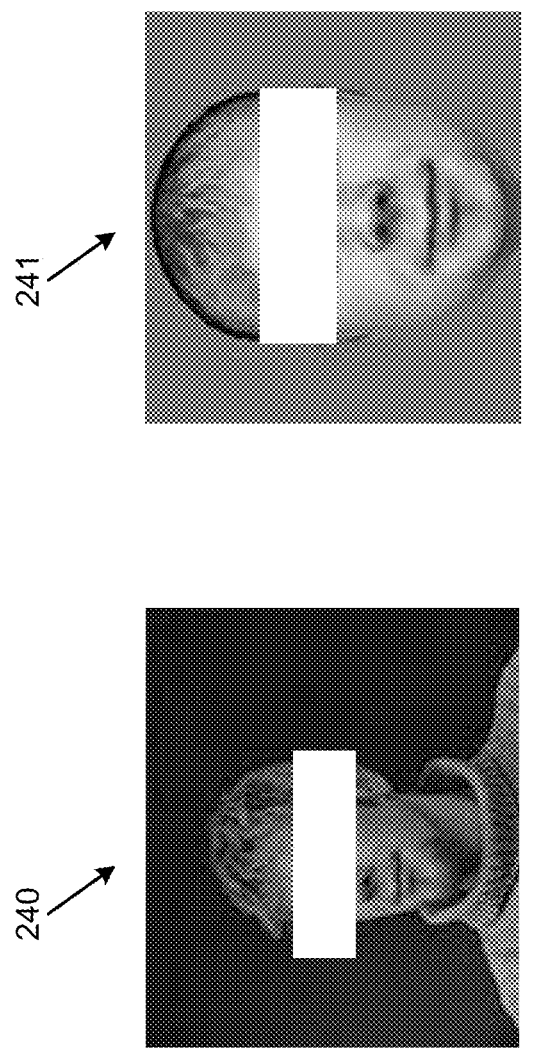
FIG. 20 illustrates generation of a three-dimensional (3D) model for a face captured from a uniform background, with frontal face deviation of generally less than approximately ±45° from front/center, and independence from facial expression, according to an example of the present disclosure.

With respect to use of the 3D face modeling module 114 to generate frontal images from angled faces through a 3D face modeling process, the 3D face modeling module 114 may be used as a pre-processing step for the face-in-the crowd module 113 that uses 2D images for face detection for frontal faces that are obtained from a uniform background (e.g., a white, or single color background), with frontal face deviation of generally less than approximately ±45° from front/center, and independent of facial expression. For example, as shown in FIG. 20, the 3D face modeling module 114 may be used as a pre-processing step for the face-in-the crowd module 113 for a frontal face 240 that is obtained from a uniform background, with frontal face deviation of generally less than approximately ±45° from front/center, and independent of facial expression, to generate a 3D model 241.

Figure 21:
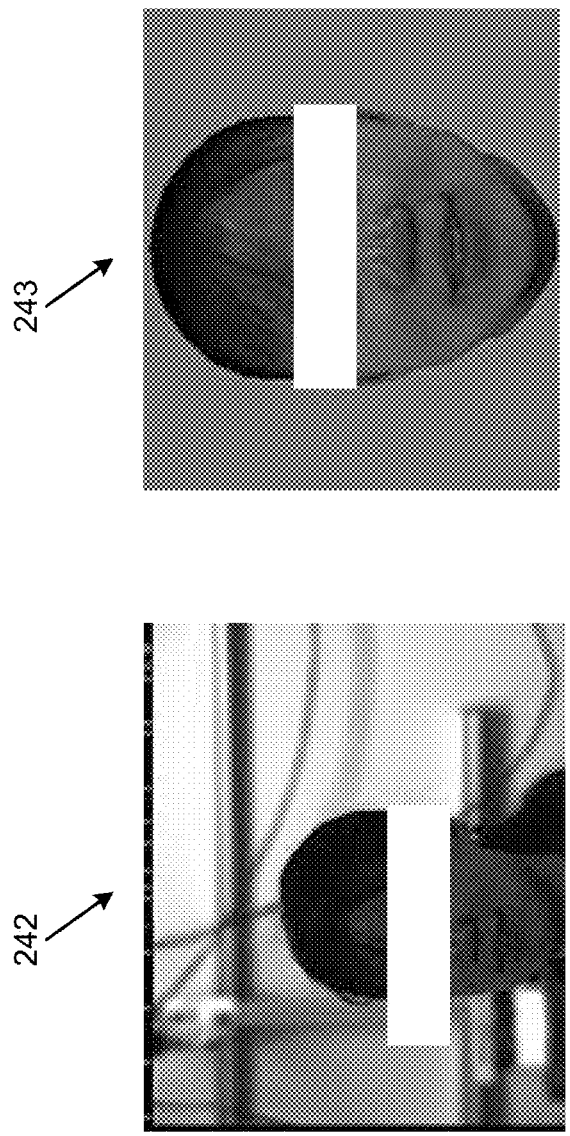
FIG. 21 illustrates generation of a 3D model for a face captured from a non-uniform background, with frontal face deviation of generally less than approximately ±30° from front/center, according to an example of the present disclosure.

For a non-uniform background, the 3D face modeling module 114 may be used as a pre-processing step for the face-in-the crowd module 113 for frontal faces that are disposed at less than approximately ±30° from front/center. For example, as shown in FIG. 21, for a non-uniform background, the 3D face modeling module 114 may be used as a pre-processing step for the face-in-the crowd module 113 for a frontal face 242 that is disposed at less than approximately ±30° from front/center to generate a 3D model 243.

Figure 22:
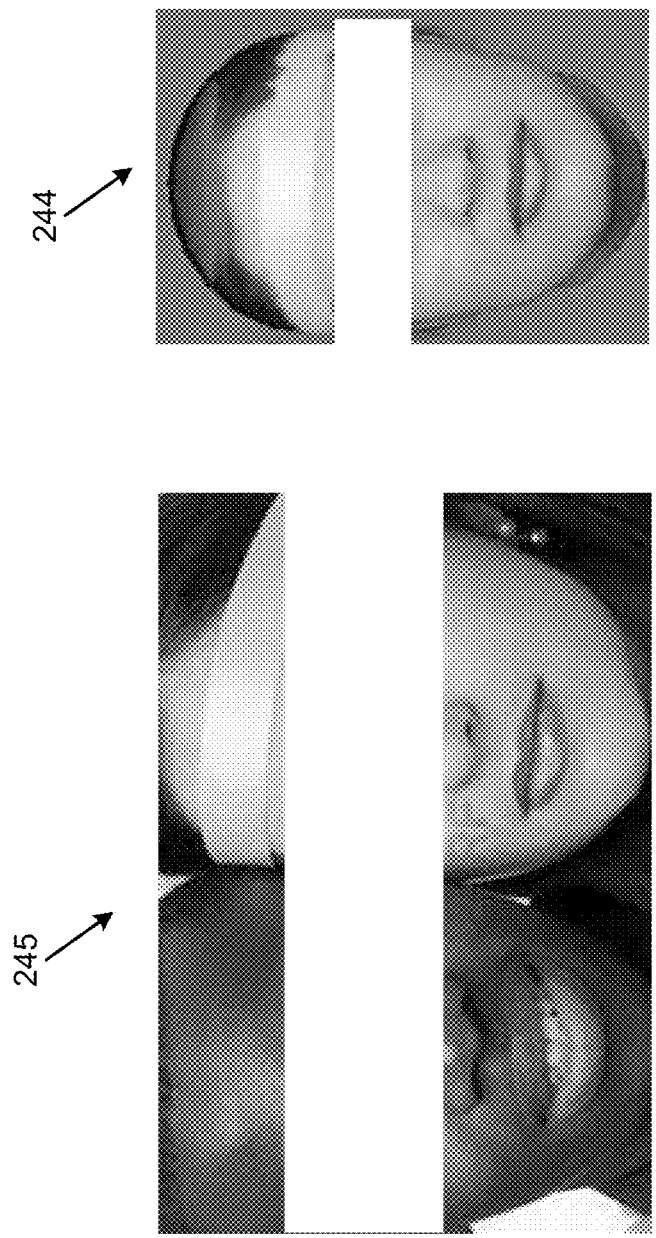
FIG. 22 illustrates generation of a 3D model of a face from multiple faces that are present within an image, according to an example of the present disclosure.

The 3D face modeling module 114 may also be used to generate a 3D model of a face from multiple faces that are present within an image. For example, as shown in FIG. 22, the 3D face modeling module 114 may be used to generate a 3D model 244 of a face from multiple faces that are present within an image 245.

With respect to use of the 3D face modeling module 114 for human adjudication, the 3D face modeling module 114 may be used to generate a 3D face to facilitate human adjudication of faces detected by the face-in-the crowd module 113. For example, as discussed above, the monitoring user interface 111 may include a GUI for facilitating supervision of operations and intervening by security personnel 112 in case of incidents (e.g., a user not recognized, a user going forward despite video/audio feedback to go back, or in exceptional situations etc.). The 3D face modeling module 114 may provide for adjudication by the security personnel 112, for example, by positioning a reconstructed 3D face of an individual (e.g., the user 106) in the same angle as a potential 2D probe image of the individual. The probe image of the individual may be defined as an image taken at a predetermined angle and under predetermined environmental conditions (e.g., uniform background). Additionally or alternatively, the 3D face modeling module 114 may provide for adjudication by the security personnel 112, for example, by positioning a 3D face of an individual adjacent a 2D image and/or a potential 2D probe image of the individual. For example, as shown in FIG. 23, the 3D face modeling module 114 may provide for adjudication by the security personnel 112, for example, by positioning a 3D face 246 of an individual adjacent a potential 2D probe image 247 of the individual.

Figure 24:
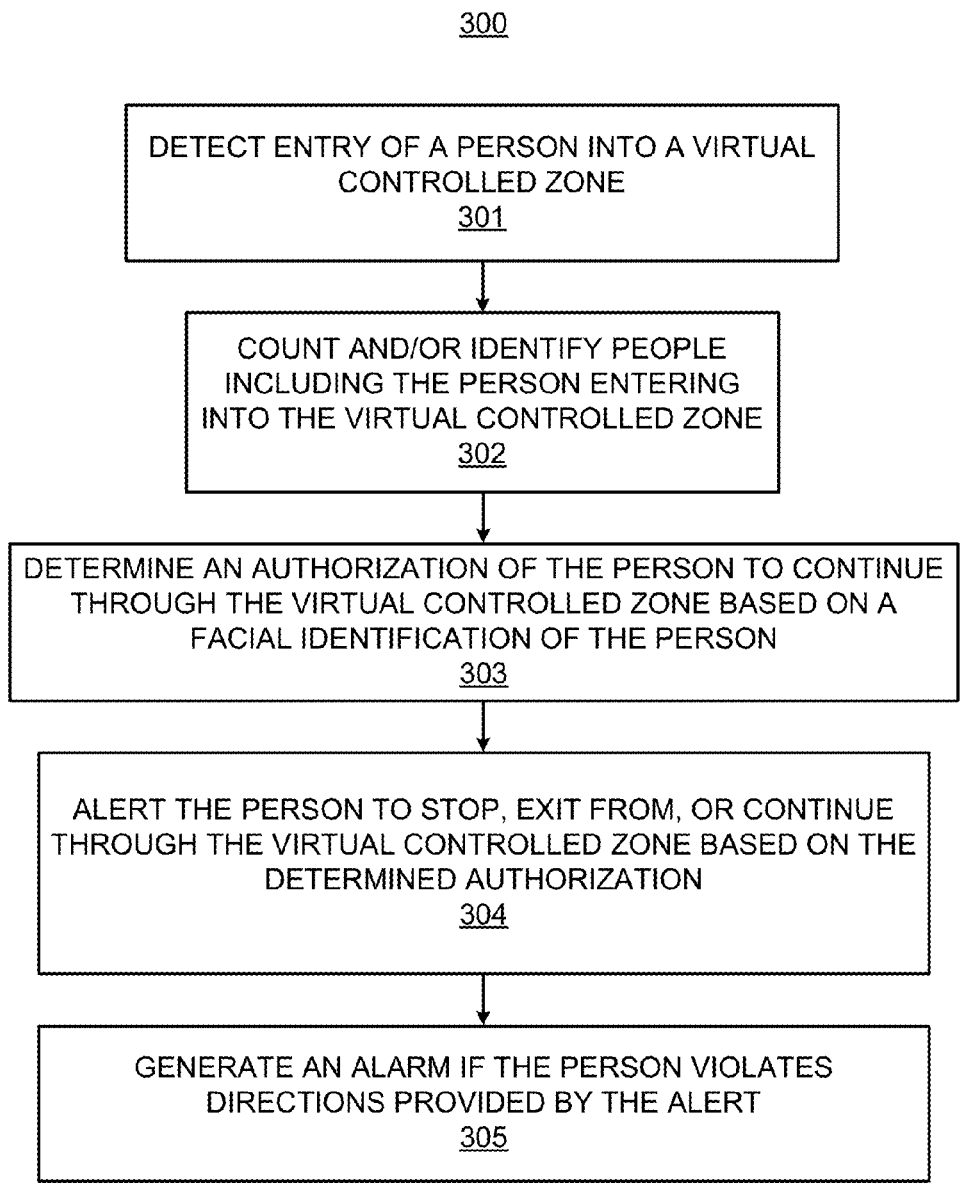
FIG. 24 illustrates a flowchart of a method for virtual access control, according to an example of the present disclosure.

FIG. 24 illustrates a flowchart of a method 300 for virtual access control, corresponding to the example of the virtual access control system 100 whose construction is described in detail above. The method 300 may be implemented on the virtual access control system 100 with reference to FIGS. 1-23 by way of example and not limitation. The method 300 may be practiced in other systems.

Referring to FIG. 24, for the method 300, at block 301, the method may include detecting entry of a person into a virtual controlled zone. For example, referring to FIG. 1 the virtual tripwire module 107 may detect when the user 106 has entered or departed from a monitoring zone (e.g., the virtual controlled zone) of the virtual access control system 100.

At block 302, the method may include counting and/or identifying people including the person entering into the virtual controlled zone. For example, referring to FIG. 1 the unicity module 108 may detect and count users 106 to ensure every user is positively identified before passing through a monitoring zone of the virtual access control system 100. The virtual tripwire module 107 and the unicity module 108 may use cameras 109 and other motion, face and/or user detection devices for the detection and counting of users 106.

At block 303, the method may include determining an authorization of the person to continue through the virtual controlled zone based on a facial identification of the person. For example, referring to FIG. 1, the decision module 104 may use authentication devices 110 for identity recognition of users 106. For example, the authentication devices 110 may include kiosk-based devices for stop-and-interact identity recognition (e.g., scan e-passport, look at camera, other biometric identification, etc.), or remotely positioned devices for on-the-fly identity recognition at a distance (e.g., a camera capturing and matching faces against a list of authorized users), which can apply to single users, or multiple users at the same time.

At block 304, the method may include alerting the person to stop, exit from, or continue through the virtual controlled zone based on the determined authorization. For example, referring to FIG. 1, the feedback module 102 may monitor and control operation of feedback devices 105, such as, for example, floor/wall lighting and audio feedback devices to indicate to people (e.g., user 106 of the virtual access control system 100) whether to stop, exit from, or continue through a secured area.

At block 305, the method may include generating an alarm if the person violates directions provided by the alert.

According to a further example, as shown in FIG. 4, alerting the person to stop, exit from, or continue through the virtual controlled zone may further include displaying arrows and/or crosses on a GUI (e.g., monitoring user interface 111) in predetermined directions and in predetermined colors to alert the person to stop, exit from, or continue through the virtual controlled zone.

According to a further example, alerting the person to stop, exit from, or continue through the virtual controlled zone may further include using floor lighting, wall lighting, and/or an audible signal to alert the person to stop, exit from, or continue through the virtual controlled zone.

According to a further example, as shown in FIG. 2A, alerting the person to stop, exit from, or continue through the virtual controlled zone may further include using wall lighting that includes primary entry and exit lights disposed adjacent a primary entry location of the virtual controlled zone, and using secondary entry and exit lights disposed adjacent a secondary entry location of the virtual controlled zone that is disposed generally opposite to the primary entry location.

According to a further example, as shown in FIG. 2B, alerting the person to stop, exit from, or continue through the virtual controlled zone may further include using floor lighting that forms arrows and/or crosses in predetermined directions and in predetermined colors to alert the person to stop, exit from, or continue through the virtual controlled zone.

According to a further example, as shown in FIG. 4, alerting the person to stop, exit from, or continue through the virtual controlled zone may further include displaying a symbol on a GUI to indicate an overcrowded state of the virtual controlled zone.

According to a further example, as shown in FIG. 7, alerting the person to stop, exit from, or continue through the virtual controlled zone may further include determining a state of occupancy of the virtual controlled zone, and generating different alerts for the person to stop, exit from, or continue through the virtual controlled zone based on different states of occupancy including the state of occupancy of the virtual controlled zone. The different states of occupancy may include a state of occupancy including a primary enter state into the virtual controlled zone, a primary exit state from the virtual controlled zone, a central empty state for the virtual controlled zone, a central occupied state for the virtual controlled zone, a central over-crowded state for the virtual controlled zone, a decision accept state based on the determined authorization to allow the person to continue through the virtual controlled zone, and/or a decision deny state based on the determined authorization to deny the person from continuing through the virtual controlled zone.

According to a further example, generating an alarm if the person violates directions provided by the alert may further include generating a visual or audible alarm if the person violates directions provided by the alert.

According to a further example, counting people including the person entering into the virtual controlled zone may further include determining an area of the person's head in a downward direction, comparing the area of the person's head to an area of the virtual controlled zone, and determining a number of people in the virtual controlled zone based on the comparison.

According to a further example, counting people including the person entering into the virtual controlled zone may further include determining a difference between entry and exit signals of the people that respectively enter and exit the virtual controlled zone.

According to a further example, identifying people including the person entering into the virtual controlled zone may further include comparing a 2D image of the face of the person against previously captured images of faces of people, and identifying the person based on a match of the 2D image of the face of the person to one of the previously captured images of faces of people.

According to a further example, identifying people including the person entering into the virtual controlled zone may further include capturing a 2D image of the face of the person by using a camera, determining an angle of the face of the person relative to a central axis of the camera, determining if the angle of the face of the person is less than or equal to a predetermined threshold relative to the central axis of the camera, based on a determination that the angle of the face of the person is less than or equal to the predetermined threshold, converting the 2D image to a 3D image model, and using the 3D image model to identify the person based on a match of the 3D image model to one of the previously captured 2D images of faces of people. The predetermined threshold may be approximately ±45° relative to the central axis of the camera.

According to a further example, using the 3D image model to identify the person based on a match of the 3D image model to one of the previously captured 2D images of faces of people may further include rotating the 3D image model to an angle approximately equal to the angle of the face of the person in the 2D image of the face of the person, and analyzing the rotated 3D image model to determine if the rotated 3D image model matches one of the previously captured 2D images of faces of people.

According to a further example, identifying people including the person entering into the virtual controlled zone may further include capturing a 2D image of the face of the person by using a camera, determining an angle of the face of the person relative to a central axis of the camera, determining if the angle of the face of the person is less than or equal to a predetermined threshold relative to the central axis of the camera, based on a determination that the angle of the face of the person is less than or equal to the predetermined threshold, converting the 2D image to a 3D image model, rotating the 3D image model to an angle approximately equal to the central axis of the camera, generating a 2D image based on the rotated 3D model, comparing the generated 2D image against previously captured images of faces of people, and identifying the person based on a match of the generated 2D image of the face of the person to one of the previously captured 2D images of faces of people. The predetermined threshold may be approximately ±30° relative to the central axis of the camera for a uniform background and approximately ±45° relative to the central axis of the camera for a non-uniform background.

According to a further example, identifying people including the person entering into the virtual controlled zone may further include using the 3D image model to further identify the person based on a match of the 3D image model to one of the previously captured 2D images of faces of people.

Figure 25:
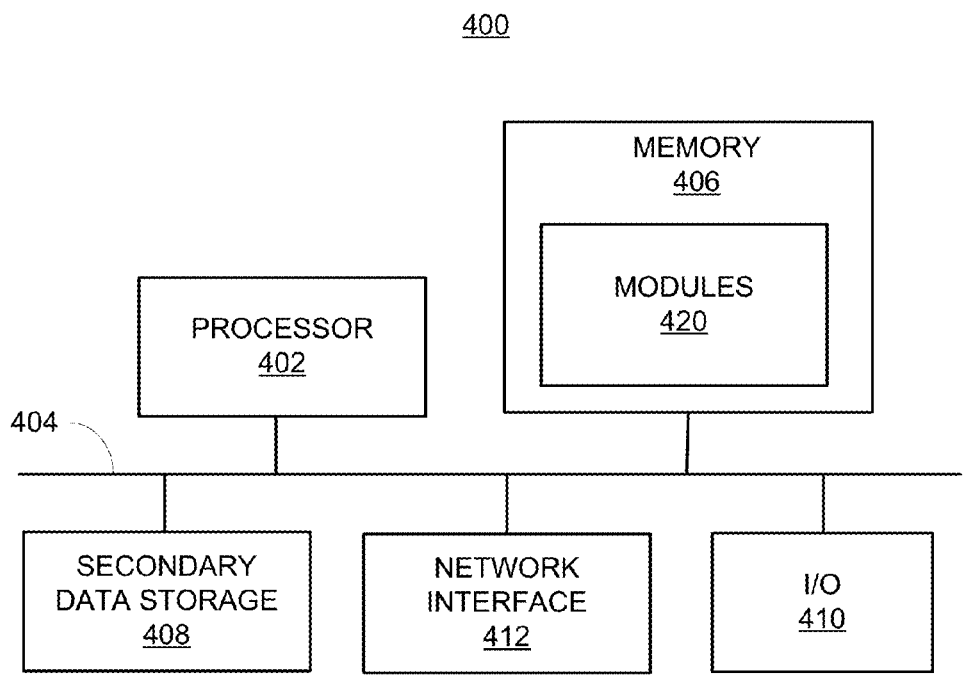
FIG. 25 illustrates a computer system, according to an example of the present disclosure.

FIG. 25 shows a computer system 400 that may be used with the examples described herein. The computer system 400 represents a generic platform that may include components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules of the system 100 shown in FIGS. 1-23.

The computer system 400 may include an I/O device 410, such as a keyboard, a mouse, a display, etc. The computer system 400 may include a network interface 412 for connecting to a network. Other known electronic components may be added or substituted in the computer system 400.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A method for virtual access control, the method comprising:
   detecting entry of a person into a virtual controlled zone;
   at least one of counting and identifying people including the person entering into the virtual controlled zone by
      capturing a two-dimensional (2D) frontal image of the face of the person by using a camera,
      determining, for the 2D frontal image, an angle of the face of the person relative to a central axis of the camera,
      determining if the angle of the face of the person for the 2D frontal image is less than or equal to a predetermined threshold relative to the central axis of the camera, wherein the predetermined threshold is approximately ±30° relative to the central axis of the camera for a uniform background and approximately ±45° relative to the central axis of the camera for a non-uniform background,
      in response to a determination that the angle of the face of the person for the 2D frontal image is less than or equal to the predetermined threshold, converting the 2D image to a 3D image model,
      rotating the 3D image model to an angle approximately equal to the central axis of the camera,
      generating a 2D image based on the rotated 3D model,
      comparing the generated 2D image against previously captured images of faces of people, and
      identifying the person based on a match of the generated 2D image of the face of the person to one of the previously captured 2D images of faces of people;
   determining, by a processor, an authorization of the person to continue through the virtual controlled zone based on a facial identification of the person;
   alerting the person to stop, exit from, or continue through the virtual controlled zone based on the determined authorization by
      determining whether a number of people inside the virtual controlled zone exceeds a predetermined threshold, wherein
         the predetermined threshold is at least one,
         the number of people is at least one person, and
         the exceeding of the predetermined threshold represents an overcrowded state of the virtual controlled zone, wherein the overcrowded state of the virtual controlled zone represents a state of the virtual controlled zone for which the number of people inside the virtual controlled zone exceeds the predetermined threshold that represents a specified number of the people that are to be allowed inside the virtual controlled zone, and
      in response to a determination that the number of people inside the virtual controlled zone exceeds the predetermined threshold, displaying a symbol on a graphical user interface (GUI) to indicate the overcrowded state of the virtual controlled zone; and
   generating an alarm if the person violates directions provided by the alert.

2. A non-transitory computer readable medium having stored thereon machine readable instructions for virtual access control, the machine readable instructions when executed cause a computer system to:
   detect entry of a person into a virtual controlled zone;
   identify the person entering into the virtual controlled zone by
      capturing a plurality of two-dimensional (2D) images of a face of the person by using a camera,
      determining, for each of the plurality of captured 2D images of the face of the person, an angle of the face of the person relative to a central axis of the camera,
      identifying, from the plurality of captured 2D images of the face of the person, 2D images for which the angle of the face of the person is less than or equal to a predetermined threshold relative to the central axis of the camera, wherein the predetermined threshold relative to the central axis of the camera for a uniform background is less than the predetermined threshold relative to the central axis of the camera for a non-uniform background, and
      performing, by using the identified 2D images for which the angle of the face of the person is less than or equal to the predetermined threshold relative to the central axis of the camera, three-dimensional (3D) modeling by converting the identified 2D images to a 3D image model, and using the 3D image model to identify the person based on a match of the 3D image model to one of previously captured 2D images of faces of people;
   determine, by a processor, an authorization of the person to continue through the virtual controlled zone based on at least one of a facial and an information based identification of the person;
   alert the person to stop, exit from, or continue through the virtual controlled zone based on the determined authorization; and
   generate an alarm if the person violates directions provided by the alert.

3. The non-transitory computer readable medium according to claim 2, wherein the machine readable instructions to generate the alarm if the person violates directions provided by the alert, further comprise machine readable instructions that when executed further cause the computer system to:
   generate a visual or audible alarm if the person violates directions provided by the alert.

* * * * *

UNITED STATES PATENT AND TRADEMARK OFFICE
CERTIFICATE OF CORRECTION

PATENT NO. : 10,453,278 B2  
APPLICATION NO. : 14/011173  
DATED : October 22, 2019  
INVENTOR(S) : Cyrille Bataller et al.

Page 1 of 1

It is certified that error appears in the above-identified patent and that said Letters Patent is hereby corrected as shown below:

On the Title Page

At Item (30), Foreign Application Priority Data "12290281" should be "12290281.0".
At Item (30), Foreign Application Priority Data "12290299" should be "12290299.2".

Signed and Sealed this
Seventeenth Day of December, 2019

Andrei Iancu
*Director of the United States Patent and Trademark Office*